United States Patent
Levin

(10) Patent No.: US 8,145,800 B2
(45) Date of Patent: Mar. 27, 2012

(54) IDENTIFYING WHEN A USB SELF-POWERED DEVICE IS CONNECTED TO A MEDICAL DEVICE BY TRIGGERING AN ALERT ABOUT A POTENTIAL RISK TO PATIENT

(75) Inventor: Roland Levin, San Ramon, CA (US)

(73) Assignee: Fresenius Medical Card Holdings, Inc., Waltham, MA (US)

( * ) Notice: Subject to any disclaimer, the term of this patent is extended or adjusted under 35 U.S.C. 154(b) by 61 days.

(21) Appl. No.: 12/504,306

(22) Filed: Jul. 16, 2009

(65) Prior Publication Data
US 2010/0168653 A1  Jul. 1, 2010

Related U.S. Application Data

(63) Continuation-in-part of application No. 12/347,297, filed on Dec. 31, 2008.

(51) Int. Cl.
G06F 3/00 (2006.01)
H02J 7/00 (2006.01)

(52) U.S. Cl. ............... 710/15; 710/14; 710/16; 710/18; 710/62; 710/305; 713/300; 713/310; 713/320; 713/322; 713/324; 713/340; 604/29; 604/27; 320/136; 320/114; 320/112

(58) Field of Classification Search ............ 710/62–64, 710/305, 14–19; 713/300, 310, 320, 322, 713/340; 307/115
See application file for complete search history.

(56) References Cited

U.S. PATENT DOCUMENTS

| | | | |
|---|---|---|---|
| 3,742,947 A | 7/1973 | Hashem | |
| 3,886,932 A | 6/1975 | Suessmilch | 128/2.1 R |
| 4,976,681 A | 12/1990 | Magro | |
| 5,324,422 A | 6/1994 | Colleran et al. | 210/85 |
| 5,421,823 A | 6/1995 | Kamen et al. | 604/28 |
| 5,431,626 A | 7/1995 | Bryant et al. | 604/65 |
| 5,438,510 A | 8/1995 | Bryant et al. | 364/413.11 |
| 5,575,807 A | 11/1996 | Faller | |
| 5,615,091 A | 3/1997 | Palatnik | |
| 5,671,738 A * | 9/1997 | Thornberg | 600/407 |
| 5,903,211 A | 5/1999 | Flego et al. | |
| 5,935,099 A | 8/1999 | Peterson et al. | |
| 6,503,062 B1 | 1/2003 | Gray et al. | 417/53 |

(Continued)

FOREIGN PATENT DOCUMENTS

EP  0 717 341 A1  6/1996

(Continued)

OTHER PUBLICATIONS

Universal Serial Bus Specification 2.0 (Chapters 1, 2, 9, 10), Apr. 27, 2000.

(Continued)

*Primary Examiner* — Tammara Peyton
(74) *Attorney, Agent, or Firm* — Fish & Richardson P.C.

(57) ABSTRACT

In some aspects, a method includes determining whether a universal serial bus (USB) peripheral device is connected to a USB monitoring device that is connected to a medical device and drawing power from the medical device. The medical device is configured for use in a medical procedure with a patient. The method also includes determining whether the USB peripheral device is drawing power from the medical device if the USB peripheral device is determined to be connected to the USB monitoring device.

50 Claims, 14 Drawing Sheets

U.S. PATENT DOCUMENTS

| | | | |
|---|---|---|---|
| 6,665,806 B1 * | 12/2003 | Shimizu | 713/324 |
| 6,808,369 B2 | 10/2004 | Gray et al. | 417/38 |
| 6,814,547 B2 | 11/2004 | Childers et al. | 417/53 |
| 6,929,751 B2 | 8/2005 | Bowman, Jr. et al. | 210/741 |
| 7,083,719 B2 | 8/2006 | Bowman, Jr. et al. | 210/143 |
| 7,124,307 B2 | 10/2006 | Sugita et al. | 713/300 |
| 7,571,336 B2 * | 8/2009 | Barthe et al. | 713/340 |
| 7,966,064 B2 | 6/2011 | Hopermann et al. | |
| 8,030,891 B2 | 10/2011 | Welsch et al. | |
| 2002/0052551 A1 * | 5/2002 | Sinclair et al. | 600/476 |
| 2003/0172318 A1 | 9/2003 | Sugita et al. | |
| 2004/0113498 A1 | 6/2004 | Kroenke | |
| 2004/0143297 A1 * | 7/2004 | Ramsey, III | 607/5 |
| 2005/0001179 A1 | 1/2005 | Gisler et al. | |
| 2006/0265540 A1 | 11/2006 | Mass et al. | |
| 2007/0260783 A1 | 11/2007 | Combs et al. | 710/62 |
| 2009/0177046 A1 | 7/2009 | Zhang et al. | |
| 2009/0256527 A1 * | 10/2009 | Welsch et al. | 320/136 |
| 2010/0026499 A1 | 2/2010 | Lamb | |

FOREIGN PATENT DOCUMENTS

| | | |
|---|---|---|
| EP | 1 553 480 A1 | 7/2005 |
| JP | 2006-266951 | 10/2006 |
| WO | WO2006/116480 | 11/2006 |

OTHER PUBLICATIONS

Product Data Sheet. Phillips ISP1521 Hi-Speed Universal Serial Bus hub controller. Rev. 04—Mar. 30, 2006, 55 pages.

Product Data Sheet. Burr-Brown Products from Texas Instruments. High-Side Measurement, Current Shunt Monitor. Dec. 1999, Revised Nov. 2005, 13 pages.

Newton IQ Cycler Operator Manual, Part No. 470203 Rev. F, 2000-2006.

International Search Report for International Application No. PCT/US2009/067454 dated Apr. 8, 2010.

* cited by examiner

IDENTIFYING WHEN A USB SELF-POWERED DEVICE IS CONNECTED TO A MEDICAL DEVICE BY TRIGGERING AN ALERT ABOUT A POTENTIAL RISK TO PATIENT

CROSS-REFERENCE TO RELATED APPLICATIONS

This application is a continuation-in-part application of, and claims priority under 35 U.S.C. §120 to, U.S. application Ser. No. 12/347,297, entitled "Identifying A Self-Powered Device Connected To A Medical Device," and filed Dec. 31, 2008, which is incorporated by reference herein.

TECHNICAL FIELD

This patent application relates generally to identifying a self-powered device connected to a medical device.

BACKGROUND

Medical devices traditionally have been designed to have an extremely low leakage current in order to prevent or limit safety risks to patients.

SUMMARY

In one aspect of the invention, a method includes determining whether a universal serial bus (USB) peripheral device is connected to a USB monitoring device that is connected to a medical device and drawing power from the medical device. The medical device is configured for use in a medical procedure with a patient. The method also includes determining whether the USB peripheral device is drawing power from the medical device if the USB peripheral device is determined to be connected to the USB monitoring device.

In another aspect of the invention, a universal serial bus monitoring device includes a memory that is configured to store instructions for execution. One or more processing devices are configured to execute the instructions that cause the one or more processing devices to determine whether a USB peripheral device is connected to the USB monitoring device. The USB monitoring device is configured to be connected to a medical device and is configured to draw power from the medical device. The medical device is configured for use in a medical procedure with a patient. If the USB peripheral device is determined to be connected to the USB monitoring device, the USB monitoring device determines whether the USB peripheral device is drawing power from the medical device.

In a further aspect of the invention, one or more computer-readable media store executable instructions including tangible media. The instructions cause one or more processing devices to determine whether a universal serial bus peripheral device is connected to a USB monitoring device that includes the one or more processing devices. The USB monitoring device is configured to be connected to a medical device and is configured to draw power from the medical device. The medical device is configured for use in a medical procedure with a patient. If the USB peripheral device is determined to be connected to the USB monitoring device, the USB monitoring device determines whether the USB peripheral device is drawing power from the medical device.

In an additional aspect of the invention, a method includes determining that a universal serial bus peripheral device connected to a USB monitoring device is not drawing power from a medical device. The USB monitoring device is configured to be connected to the medical device and is configured to draw power from the medical device. The medical device is configured for use in a medical procedure with a patient. An alarm is activated responsively to determining that the USB peripheral device is not drawing power from the medical device.

In another aspect of the invention, a universal serial bus monitoring device includes a memory that is configured to store instructions for execution, and one or more processing devices that are configured to execute the instructions. The instructions cause the one or more processing devices to determine that a USB peripheral device connected to the USB monitoring device is not drawing power from a medical device. The USB monitoring device is configured to be connected to the medical device and is configured to draw power from the medical device. The medical device is configured for use in a medical procedure with a patient. An alarm is activated responsively to the determining that the USB peripheral device is not drawing power from the medical device.

In a further aspect of the invention, a method includes monitoring a first universal serial bus data line and a second USB data line on a USB monitoring device. The USB monitoring device is configured to be connected to a medical device and is configured to draw power from the medical device. The medical device is configured for use in a medical procedure with a patient. If at least one of the first USB data line or the second USB data line goes to a high state, an output of a current detection circuit is monitored. The output is indicative of whether power is or is not being drawn from the medical device by a USB peripheral device connected to the USB monitoring device.

In an additional aspect of the invention, a universal serial bus monitoring device includes a current detection circuit, a memory configured to store instructions for execution, and one or more processing devices configured to execute the instructions. The instructions cause the one or more processing devices to monitor a first USB data line and a second USB data line on the USB monitoring device configured to be connected to a medical device and being configured to draw power from the medical device. The medical device is configured for use in a medical procedure with a patient. If at least one of the first USB data line or the second USB data line goes to a high state, an output of the current detection circuit is monitored. The output is indicative of whether power is or is not being drawn from the medical device by a USB peripheral device connected to the USB monitoring device.

In another aspect of the invention, a universal serial bus monitoring device includes a memory configured to store instructions for execution, USB ports configured to receive respective USB connectors of respective USB peripheral devices to connect the respective USB peripheral devices to the USB monitoring device, and current detection circuits respectively coupled to the USB ports. The current detections circuits have respective outputs. The USB monitoring device also includes a USB hub circuit coupled to the current detection circuits. The USB hub circuit is configured to provide power from a medical device to the respective USB peripheral devices and to provide signal connections between the USB peripheral devices and the medical device. The USB monitoring device is configured to be connected to the medical device and is configured to draw power from a device. The medical device is configured for use in a medical procedure with a patient. One or more processing devices are configured to execute the instructions that cause the one or more processing devices to determine whether one or more USB peripheral devices are connected to the USB monitoring device at any of the USB ports. If one or more USB peripheral devices are determined to be connected to the USB monitoring device, the USB monitoring device determines whether any of the one or more USB peripheral devices is drawing power from the medical device by monitoring the respective outputs of the current detection circuits.

Implementations may include one or more of the following features.

In some implementations, an alarm is activated if the USB peripheral device is determined to not be drawing power from the medical device.

In some implementations, activating the alarm includes at least one of displaying a warning light on the USB monitoring device, or triggering an audible alarm on the USB monitoring device.

In some implementations, activating the alarm includes triggering an audible alarm on the medical device, or causing a warning message to be displayed on a user interface included in the medical device.

In some implementations, if the USB peripheral device is determined to not be drawing power from the medical device, the USB peripheral device is electrically isolated from the medical device and the patient.

In some implementations, electrically isolating the USB peripheral device from the medical device and the patient includes disconnecting one or more signal lines connected to a USB port of the USB monitoring device. The USB port is configured to receive a USB connector of the USB peripheral device.

In some implementations, the one or more signal lines include a first USB data line, a second USB data line, a USB power line, and a USB ground line.

In some implementations, the medical device includes a USB host device capable of providing power to the USB monitoring device and the USB peripheral device. The USB monitoring device includes a first USB connector and the USB peripheral device includes a second USB connector. The USB host device includes a first USB port to receive the first USB connector. The USB monitoring device includes a second USB port to receive the second USB connector so that the USB peripheral device can be connected to the USB monitoring device.

In some implementations, the USB monitoring device includes a first USB port to receive a first USB connector of the USB peripheral device, a second USB port to receive a second USB connector of a second USB peripheral device, and a USB hub circuit configured to receive power from the medical device and to distribute power to the first USB peripheral device and the second USB peripheral device.

In some implementations, the USB monitoring device includes a first current detection circuit connected between the first USB port and the USB hub circuit, and a second current detection circuit connected between the second USB port and the USB hub circuit.

In some implementations, the USB monitoring device includes one or more processing devices.

In some implementations, determining whether the USB peripheral device is connected to the USB monitoring device includes monitoring a first USB data line and a second USB data line using the one or more processing devices. If at least one of the first USB data line or the second USB data line goes to a high state, the USB monitoring device determines that the USB peripheral device is connected to the USB monitoring device.

In some implementations, determining whether the USB peripheral device is connected to the USB monitoring device includes triggering an interrupt of the one or more processing devices if at least one of a first USB data line or a second USB data line goes to a high state.

In some implementations, determining whether the USB peripheral device is connected to the USB monitoring device includes polling the first USB data line and the second USB data line using the one or more processing devices to confirm that the USB peripheral device is connected to the USB monitoring device.

In some implementations, determining whether the USB peripheral device is drawing power from the medical device includes monitoring an output of a current detection circuit using the one or more processing devices. The USB monitoring device includes the current detection circuit. If the output is at a low state, the USB monitoring device determines that the USB peripheral device is not drawing power from the medical device.

In some implementations, the current detection circuit includes an operational amplifier including a positive input, a negative input, and the output of the current detection circuit. The current detection circuit also includes a first resistor connected between a power supply and the positive input, and a second resistor connected between a signal ground and the positive input. The first and the second resistors form a voltage divider between the power supply and the signal ground. The current detection circuit also includes a third resistor connected between the power supply and the negative input.

In some implementations, wherein the power supply includes a power supply of the USB monitoring device and the signal ground includes a signal ground of the USB monitoring device.

In some implementations, the power supply of the USB monitoring device includes a power supply of the medical device or a power supply that draws power from the power supply of the medical device.

In some implementations, the output is at a low state when a first voltage at the positive input is less than a second voltage at the negative input.

In some implementations, the medical procedure includes hemodialysis and the medical device includes a hemodialysis device.

In some implementations, the medical procedure includes an extracorporeal medical procedure in which a portion of blood is removed from the patient. The portion of the blood is processed by the medical device, and at least some of the portion of blood is subsequently returned to the patient.

In some implementations, the medical procedure includes peritoneal dialysis and the medical device includes a peritoneal dialysis device.

In some implementations, the instructions further include instructions that cause the one or more processing devices to activate an alarm if the USB peripheral device is determined to not be drawing power from the medical device.

In some implementations, the instructions further include instructions that cause the one or more processing devices to electrically isolate the USB peripheral device from the medical device and the patient if the USB peripheral device is determined to not be drawing power from the medical device.

In some implementations, the medical device includes a USB host device capable of providing power to the USB peripheral device. The USB peripheral device includes a USB connector. The USB host device includes a USB port to receive the USB connector so that the USB peripheral device can be connected to the medical device. The USB host device includes the memory and the one or more processing devices.

In some implementations, determining whether the USB peripheral device is connected to the USB monitoring device includes monitoring a first USB data line and a second USB data line. If at least one of the first USB data line or the second USB data line goes to a high state, the USB monitoring device determines that the USB peripheral device is connected to the USB monitoring device.

In some implementations, the USB monitoring device includes a current detection circuit. Determining whether the USB peripheral device is drawing power from the medical device includes monitoring an output of the current detection circuit. If the output is at a low state, the USB monitoring device determines that the USB peripheral device is not drawing power from the medical device.

In some implementations, if the output indicates that power is not being drawn from the medical device by the USB peripheral device at least one of electrically isolating the USB peripheral device from the medical device and the patient, or activating an alarm is performed.

The foregoing methods may be implemented as an apparatus or system that includes one or more processing devices and memory to store executable instructions to implement the methods.

The details of one or more examples are set forth in the accompanying drawings and the description below. Further features, aspects, and advantages will become apparent from the description, the drawings, and the claims.

DETAILED DESCRIPTION

Figure 1A:
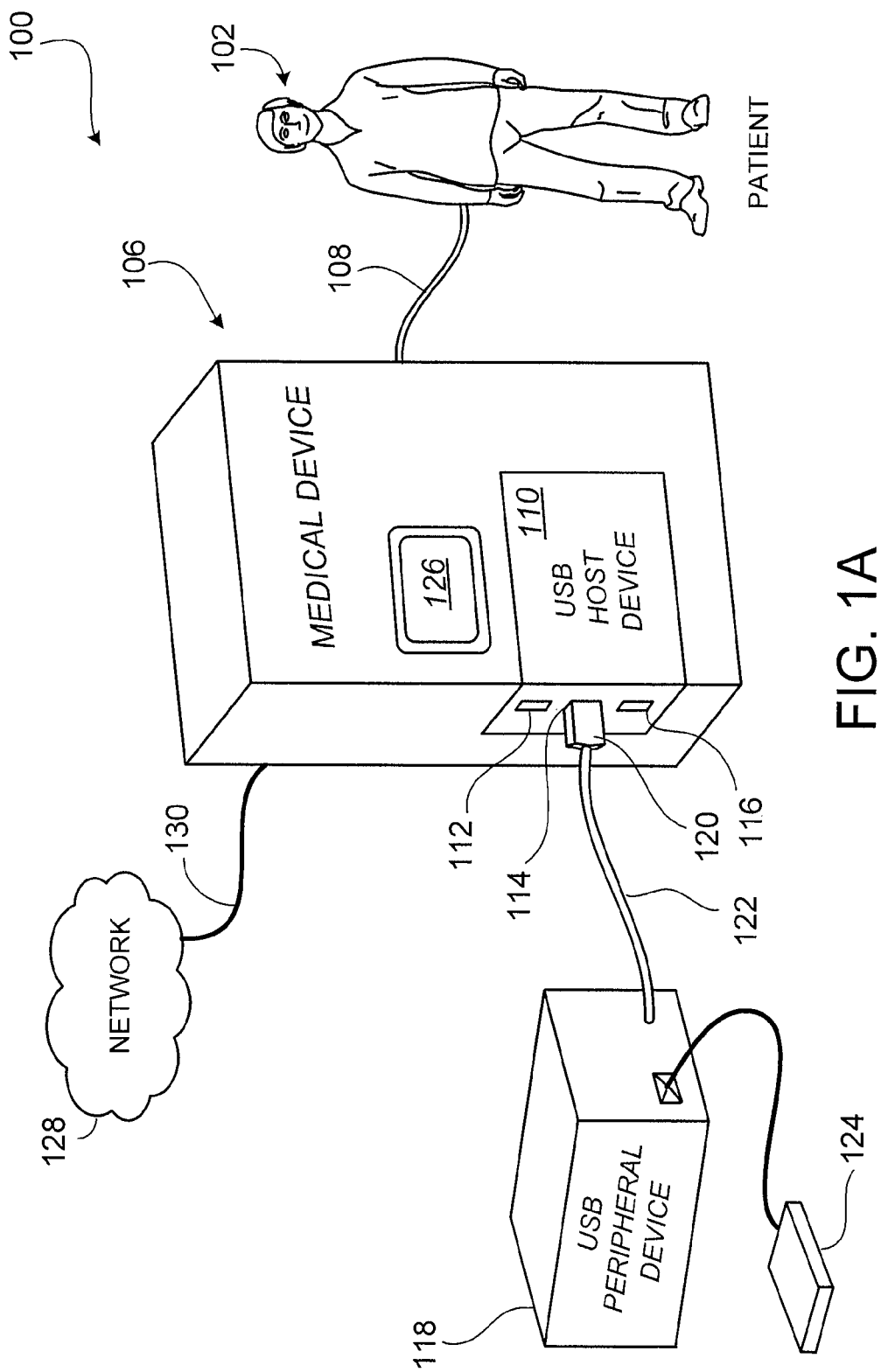
FIG. 1A is a diagram showing an example of a patient care environment that includes an example medical device.

Devices that receive power from, e.g., a wall outlet, generally must include protection from voltage surges and from leakage current. A device may include an isolation transformer to, e.g., provide voltage isolation so that the device is isolated from, e.g., a surge on an electrical outlet. Likewise, a device with an isolation transformer may be designed to limit the potential for leakage current from the power supply and through the isolation transformer to the device. That is, to protect users of the device from becoming a path to ground in the event of an electrical fault, the potential leakage current of a device may be limited.

Medical grade power supplies generally require a higher degree of protection from voltage surges and from leakage current than non-medical grade power supplies and thus must meet very strict standards. For example, a non-medical grade power supply (e.g., a power supply for a laptop computer) may only need to be isolated from, e.g., at least 2,000 volts, while a medical grade power supply may require voltage isolation level of, e.g., at least 4,000 volts before a breakdown.

Similarly, medical devices traditionally have been designed to have an extremely low leakage current (e.g., 5 microamperes (µA)) in order to prevent or limit safety risks to patients. Non-medical grade power supplies and medical devices using these power supplies may not be required to meet such strict standards.

Leakage current is a serious safety concern in medical devices because of risks to patients. Like in any device with electrical circuitry, electrical faults can occur in medical devices where, for example, a safety ground for the medical device is disconnected or fails, due to a malfunction or damage within the device, or due to, e.g., user error. An electrical fault in a medical device generally presents a much higher safety risk than in a non-medical device because direct contact to a patient is far more likely with a medical device, and such a patient may be grounded and may present a path to ground for the leakage current. If parts of the electrical system of the medical device are directly or indirectly in contact with, e.g., the patient's circulatory system, then the leakage current may find a path to ground through the patient's heart with potentially fatal consequences for the patient.

For example, in hemodialysis (discussed in more detail below) part of the patient's blood is transported from the patient's body to one side of a dialyzer filter on a hemodialysis device. On the other side of the dialyzer filter, a solution called dialysate contacts mechanical pumps in the hemodialysis device. If an electrical fault occurs relating to one of the mechanical pumps, then leakage current from the pump could find a path to ground by traveling through the dialysate, to the blood on the other side of the dialyzer filter, and back to the circulatory system of the (grounded) patient and possibly through the patient's heart. Even a small amount of leakage current can cause damage, or even death, to a patient.

Thus, medical devices, particularly devices with direct patient contact or that, e.g., break the patient's skin, are designed to have extremely low leakage current and must meet established strict standards.

Medical devices, however, only have as low a leakage current as the device with the highest leakage current connected to the medical device. That is, a medical device may be designed to have an extremely low leakage current, but if, e.g., signal lines (e.g., data or power lines) from another device with a higher potential leakage current are connected to the device, the medical device is now susceptible to the higher leakage current. If the higher leakage current is greater than medical grade requirements or than the requirements for the particular medical device, a potential safety hazard is presented.

With the advent of computer networking and the Internet, opportunities for obtaining, e.g., real-time information directly from medical devices have increased. Likewise, an increasing array of peripheral devices are available that may be advantageously serially connected to medical devices. Some medical (and other) devices may include serial ports to receive peripheral devices. For many devices having serial ports, optical isolation may be used to provide a high level of isolation when self-powered peripheral devices are connected to the serial ports.

A Universal Serial Bus (USB) peripheral device is generally connected to a USB host device, which may provide power to the peripheral device. For example, many USB peripheral devices (e.g., USB flash memory sticks and user interface devices such as keyboards or pointing devices) draw power solely from the USB host devices to which they are connected. Such a USB peripheral device, when connected to a USB port of a medical device (a USB host device), generally raises no safety issues regarding, e.g., leakage current because the USB peripheral device is powered by the medical device (the USB host device).

An increasing number of other USB peripheral devices, however, are powered by their own external power supplies (e.g., a wall outlet) and may draw no power from the USB host devices to which they are connected. Some examples of such "self-powered" USB peripheral devices include printers, scanners, video capture devices; monitors, external hard drives, audio speakers, barcode scanners, and so on. Still other USB peripheral devices (e.g., hybrid video recorders) may be configured to draw power from a USB host devices or from an external power device. Some types of USB peripheral devices (e.g., external hard drives, or keyboards) may be found in implementations that draw power from a USB host device, or in other, self-powered, implementations.

For certain types of medical devices, a self-powered USB peripheral device (whatever the variety) connected to a USB port of the medical device may generally present a potentially unsafe condition by, e.g., potentially increasing the leakage current risks to the medical device and to a patient coming into direct contact with the medical device.

A USB peripheral device generally has four signal lines: a power supply line VBUS, a signal ground line GND, and two data lines D+ and D−. USB peripheral devices may support data transfer at generally three speeds: high-speed, full-speed, and low-speed. When the USB peripheral device is first connected to a USB host device, the respective initial states of the two data lines D+ and D− (e.g., [D+ high, D− low] or [D+ low, D− high]) may generally indicate the operating data transfer speed of the USB peripheral device. Low speed USB peripheral devices identify themselves with a "high" state on the data line D− and a "low" state on the data line D+, while full speed and high speed USB peripheral devices identify themselves with a high state on the data line D+ and a low state on the data line D−. When no USB peripheral device is connected to a USB port, both data lines D+ and D− are at a low state.

Connecting a self-powered USB peripheral device to a medical device that meets strict power supply standards for, e.g., leakage current may compromise the safety of the device. Any of the four signal lines VBUS, GND, D+, and D− of a self-powered USB peripheral device would present a potential avenue for leakage current into medical device (a USB host device) to which the USB peripheral device was connected, thus leaving a patient who is grounded potentially vulnerable to the leakage current.

FIG. 1A shows an example of a patient care environment 100 that includes an example medical device 106. The medical device 106 is configured for use in a medical procedure with a patient 102 so that, e.g., the patient 102 may receive medical treatment from the medical device 106. A connector tube 108 connects the patient 102 to the medical device 106. The connector tube 108 may, e.g., transport blood or another fluid from the patient 102 to the medical device 106 and back again to the patient 102. In some implementations, the connector tube 108 may be considered part of the medical device 106. The medical device 106 may include a display and/or user interface 126 at which, e.g., information regarding the medical procedure and/or the patient may be displayed. The display and/or user interface 126 may include a touch screen at which data may be, e.g., entered by an operator of the medical device (e.g., a health care practitioner (HCP) such as, e.g., a doctor, a nurse, a patient care technician, or a home health aide). The medical device 106 may include other user interface devices (not shown in FIG. 1A) such as, e.g., a keyboard or pointing device. The medical device 106 may be configured to communicate with an external network 128, such as a local-area network or the Internet, via a wired or wireless connection 130.

The medical device 106 may include one or more processing devices. The one or more processing devices may be used to manage and oversee the functions of the medical procedure and to, for example, monitor, analyze and interpret patient vital signs and medical procedure parameters during the medical procedure.

The medical device 106 includes a Universal Serial Bus host device 110. In some implementations, the USB host device 110 may be considered to be coextensive with the medical device 106 so that, e.g., the USB host device 110 may be the medical device 106 itself. In other implementations, the medical device 106 may include, e.g., one or more devices connected to one another, with one of the devices including the USB host device 110.

In some implementations, the USB host device 110 (and thus the medical device 106) may include one or more USB ports configured to receive USB connectors from USB peripheral devices. The USB host device 110 of the medical device 106 may include three USB ports 112, 114, 116 being shown in FIG. 1A. In implementations, the connection 130 to the external network 128 may be wired and be plugged into one of the USB ports 112, 114, 116.

As discussed above, while some USB peripheral devices (e.g., USB flash memory sticks) draw power solely from the USB host devices to which they are connected, other USB peripheral devices may be powered by their own external power supplies and may draw no power from the USB host devices to which they are connected.

In FIG. 1A, an example USB peripheral device 118 is connected to the medical device 116 via a cord 122 and a USB connector 120. The USB connector 120 is plugged into the USB port 114 on the USB host device 110 of the medical device 106. The USB peripheral device 118 is powered by its own external power supply 124 and draws no power from the USB host device 110 of the medical device 106. In some implementations, the cord 112, the USB connector 120, and the external power supply 124 may be considered part of the USB peripheral device 118. The USB connector 120 of FIG. 1A is a series A plug. In other implementations, series A connectors (plugs and/or receptacles) and/or series B connectors (plugs and/or receptacles) may be used.

As described above, some examples of "self-powered" USB peripheral devices include printers, scanners, video capture devices, monitors, external hard drives, audio speakers, barcode scanners, and so on.

The medical device 106 may be configured for use in a medical procedure with a patient. The medical procedure may be any of a variety of medical procedures, including, for example, an extracorporeal medical procedure in which a portion of blood is removed from the patient, the portion of the blood is processed by the medical device, and at least some of the portion of blood is subsequently returned to the patient. Even though an extracorporeal medical procedure is carried on outside of the patient's body, if the extracorporeal medical procedure is a circulatory procedure, the patient (via the circulatory system of the patient) may generally effectively be in direct contact with the medical device. The medical procedure may be, e.g., hemodialysis, and the medical device 106 may be (or may include) e.g., a hemodialysis device. An example implementation of the medical device 106 as an example hemodialysis device is described below with respect to FIG. 1B. The medical procedure may be, e.g., peritoneal dialysis, and the medical device 106 may be (or may include), e.g., a peritoneal dialysis device. In addition to or instead of hemodialysis and/or peritoneal dialysis, the medical procedure may be, e.g., hemofiltration, hemodiafiltration, plasmapheresis, apheresis, extracorporeal membrane oxygenation (ECMO), or cardiopulmonary bypass, or any combination of these. The medical procedure may include assisted blood circulation during open heart surgery and the medical device may include, e.g., a heart-lung machine. In some implementations, the medical procedure may include infusing medication into a patient's body and the medical device 106 may be (or may include), e.g., an infusion pump. In some implementations, the medical procedure may include entering a patient's body and the medical device 106 (e.g., used to enter the patient's body) may be (or may include), e.g., a surgical instrument, such as a vibrating or oscillating surgical cutting device. In some implementations in which the medical device 106 includes a surgical instrument, the connector tube 108 of FIG. 1A, may generally not be included or involved as part of the procedure. Generally, a medical procedure may involve direct contact of the medical device 106 with a bodily fluid (e.g., blood) of a patient, direct contact of an output of the medical device 106 with the patient, direct contact of the medical device with the patient's body, puncturing of the patient's skin, or any combination of these. Other examples of medical devices and equipment may include, e.g., patient monitors, external pacemakers, neurostimulators, x-ray machines, heart pumps, heart monitors, computed axial tomography (CAT or CT) equipment, magnetic resonance imaging (MRI) equipment, radiation therapy equipment, and incontinence monitors.

Figure 1B:
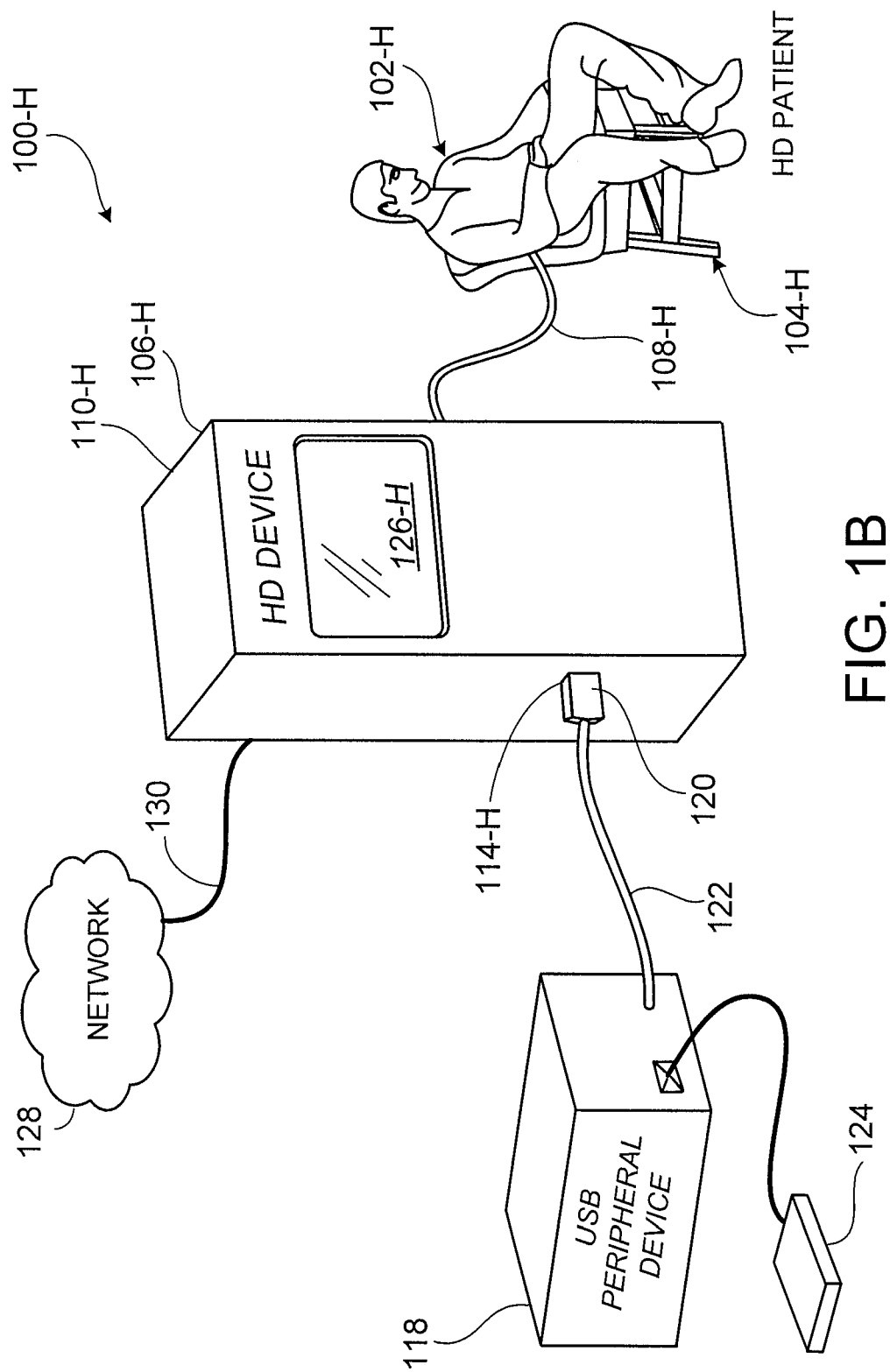
FIG. 1B is a diagram showing an example of a patient care environment that includes an example hemodialysis device.

An example of a particular type of medical device (a hemodialysis device) and particular type of medical procedure (hemodialysis) is shown in FIG. 1B. Hemodialysis is a process which employs a machine that includes a dialyzer to aid patients whose renal function has deteriorated to the point where their body cannot adequately rid itself of toxins. The dialyzer includes a semi-permeable membrane, the membrane serving to divide the dialyzer into two chambers. Blood is pumped through one chamber and a dialysis solution through the second. As the blood flows by the dialysis fluid, impurities, such as urea and creatinine, diffuse through the semi-permeable membrane into the dialysis solution. The electrolyte concentration of the dialysis fluid is set so as to maintain electrolytic balance within the patient.

Further purification in a dialyzer is possible through ultrafiltration. Ultrafiltration results from the normal situation wherein there is a positive pressure differential between the blood and the dialysis fluid chambers. This pressure differential causes water in the blood to pass through the membrane into the dialysis solution. This provides the benefit of reducing a dialysis patient's excess water load which normally would be eliminated through proper kidney functioning.

Patients undergoing dialysis therapy typically travel three or more times per week to hospital or dialysis centers that are designed for efficient and routine dialysis therapy. Hemodialysis is a complex treatment process in which, typically, an arterio-venous shunt, frequently termed a "fistula," is surgically inserted between a patient's artery and vein to facilitate transfer of blood from the patient to the dialyzer. During a normal dialysis treatment, one end of an arterial line or tube is inserted into the upstream end of the fistula (i.e., at a point near the patient's artery) and transports blood withdrawn from the upstream portion of the fistula to the inlet of the dialyzer. A venous line or tube connected to the output of the blood side of the dialyzer returns treated blood to the fistula at an insertion point downstream of the arterial line (i.e., at a point near the patient's vein).

Since dialysis involves removing blood from and returning blood to a patient, performing a dialysis procedure carries a degree of risk. Successful dialysis treatment requires monitoring of several patient vital signs and hemodialysis parameters during the dialysis process in order to optimize the overall efficacy of the dialysis procedure, to assess the condition of the fistula (the access to the patient's blood) and to determine the actual purification achieved. Some examples of parameters monitored and analyzed by a hemodialysis machine or equipment include the blood access flow rate or the rate at which blood flows out of the patient to the dialyzer, a critical parameter; and the ratio Kt/V to measure dialysis efficiency, where K is the clearance or dialysance (both terms representing the purification efficiency of the dialyzer), t is treatment time and V is the patient's total water value.

FIG. 1B shows an example of a patient care environment 100-H that includes an example hemodialysis (HD) device 106-H. The HD device 106-H is an example implementation of the medical device 106. The HD device 106-H is configured for use in hemodialysis with a hemodialysis (HD) patient 102-H seated in a chair 104-H so that, e.g., the HD patient 102-H may receive hemodialysis treatment from the HD device 106-H. A connector tube or arterial line 108-H transports blood from the HD patient 102-H to the HD device 106-H and back again to the HD patient 102-H after processing and treatment in the HD device 106-H. The HD device 106-H may include a display and/or user interface 126-H at which, e.g., information regarding the hemodialysis medical procedure and/or the patient may be displayed. The display and/or user interface 126-H may include a touch screen at which data may be, e.g., entered by an operator of the HD device 106-H. The HD device 106-H may include other user interface devices (not shown in FIG. 1B) such as, e.g., a keyboard or pointing device. As in FIG. 1A, the HD device 106-H may be configured to communicate with the external network 128 via the wired or wireless connection 130.

The HD device 106-H may include one or more processing devices. The one or more processing devices may be used to manage and oversee the functions of the hemodialysis medical procedure and to, for example, monitor, analyze and interpret patient vital signs and hemodialysis parameters during the hemodialysis medical procedure.

The example HD device 106-H includes, and is coextensive with, a USB host device 110-H. In other implementations, the HD device 106-H may include, e.g., one or more devices connected to one another, with one of the devices including the USB host device 110-H.

The HD device 106-H (or USB host device 110-H) may include one or more USB ports, with one USB port 114-H being shown in FIG. 1B. The example USB peripheral device 118 is connected to the HD device 106-H via the cord 122 and the USB connector 120. The USB connector 120 is plugged into the USB port 114-H on the USB host device 110-H (or HD device 106-H). The USB peripheral device 118 is powered by its own external power supply 124 and draws no power from the USB host device 110-H of the HD device 106-H.

Figure 2:
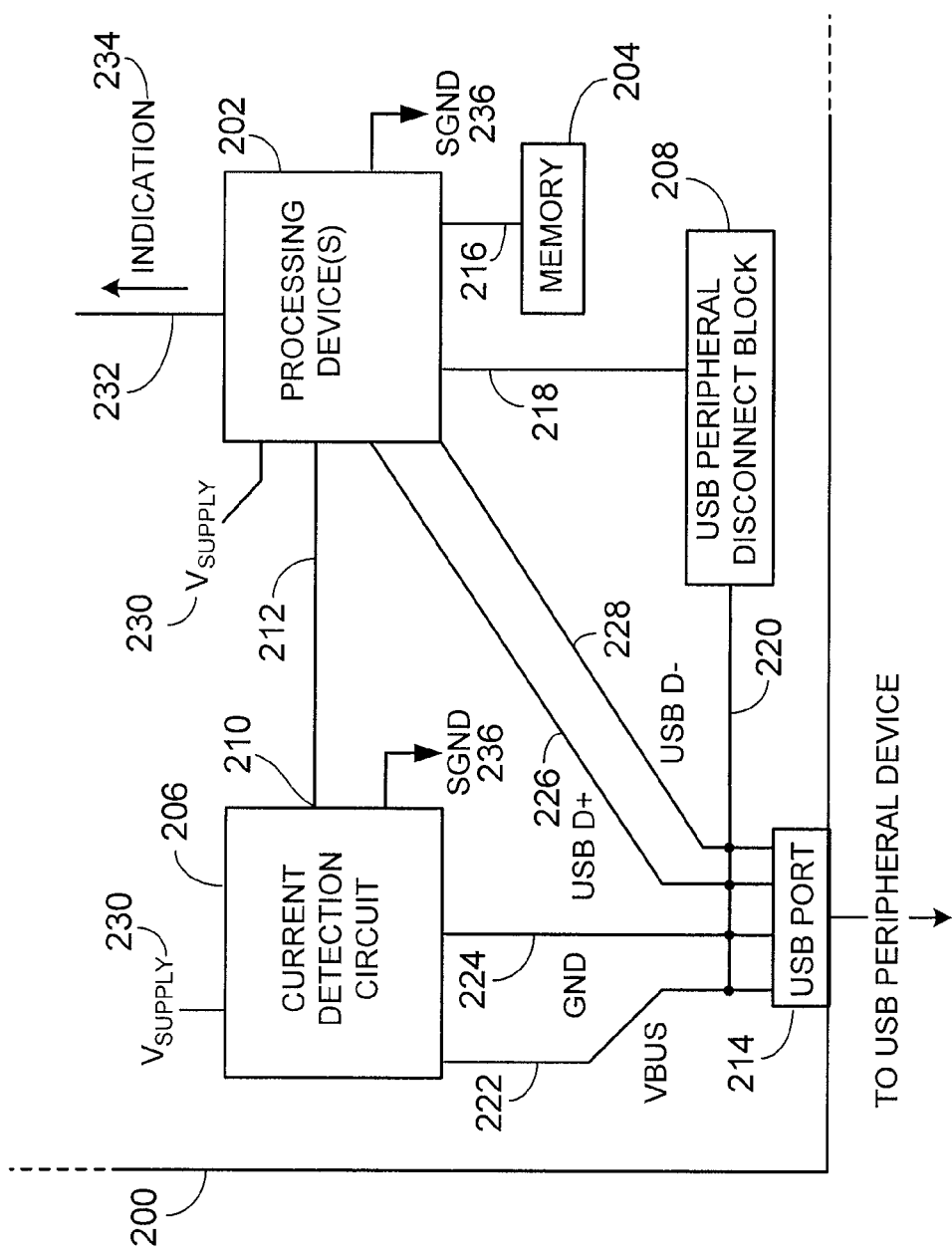
FIG. 2 is a block diagram of a portion of an example medical device.

FIG. 2 is a block diagram of a portion of an example implementation 200 of the medical device 106 of FIG. 1A (or, e.g., of example implementations of the medical device 106 such as the HD device 106-H of FIG. 1B). The medical device 200 includes one or more processing devices 202, memory 204, a current detection circuit 206, and a USB port 214.

In some implementations, the medical device 200 may include a USB peripheral disconnect block 208. In other implementations, the medical device 200 does not include the block 208. Although only one USB port 214 is shown in FIG.

2, in some implementations, the medical device 200 may include other USB ports. Each other USB port may have its own corresponding respective separate current detection circuit and its own respective separate USB peripheral disconnect block. The USB ports may also be used in, e.g., a time sharing arrangement with one or more current detection circuit and one or more USB peripheral disconnect blocks.

The current detection circuit 206 and, e.g., the one or more processing devices 202 each receive a power supply voltage $V_{SUPPLY}$ 230 for the medical device 200, and are both connected to a signal ground SGND 236 for the medical device 200. The current detection circuit 206 is connected at an output 210 of the current detection circuit 206 to a connection 212 that goes to the one or more processing devices 202. Memory 204 and the USB peripheral disconnect block 208 are connected to the one or more processing devices 202 via respective connections 216, 218.

The USB port 214 interfaces with four signal lines 222, 224, 226, 228. VBUS 222 is the power supply line for a USB peripheral device (e.g., USB peripheral device 118) connected to the USB port 214. GND 224 is the signal ground line for the USB peripheral device. Two USB data lines, USB D+ 226 and USB D− 228, are the data lines for the USB peripheral device.

The current detection circuit 206 is connected to the USB port 214 via the signal lines VBUS 222 and GND 224. The one or more processing devices 202 receive the pair of USB data lines, USB D+ 226 and USB D− 228. The USB peripheral disconnect block 208 may provide isolation (e.g., electrical isolation) of the medical device 200 from the USB port 214 and any USB peripheral device connected to the USB port 214. For example, the USB peripheral disconnect block 208 may be configured to disconnect (e.g., switch off) one or more of the signal lines 222, 224, 226, 228 at connection 220. To fully electrically isolate and more adequately protect the medical device 200 (and any patient receiving medical treatment from the medical device 200), the USB peripheral disconnect block 208 may generally configured to disconnect (e.g., switch off) all four of the signal lines at once so that the medical device 200 is not susceptible to leakage current from the attached USB peripheral device.

The medical device 200 may be configured to determine whether a USB peripheral device, such as the USB peripheral device 118, is attached to the medical device 200.

For example, in some implementations, the one or more processing devices 202 may monitor the pair of USB data lines, USB D+ 226 and USB D− 228. As described above, when a USB peripheral device, such as USB peripheral device 118, is first connected to a USB port such as, e.g., USB port 214, at least one of the USB data lines will go to a high state. The one of more processing devices 202 may be configured to sense transitions of the USB data lines 226, 228 just after or shortly after a USB peripheral device 118 is plugged into a USB port so that if at least one of the first USB data line USB D+ 226 or the second USB data line USB D− 228 goes to a high state, the one or more processing devices 202 may determine that the USB peripheral device 118 is connected to the medical device 200.

In some implementations, the one or more processing devices 202 may poll the first and second USB data lines 226, 228 to determine whether one or both of the first and second USB data lines 226, 228 have gone to a high state. The one or more processing devices 202 may poll the data lines 226, 228 periodically, e.g., every millisecond, or every few milliseconds.

In some implementations, an interrupt of the one or more processing devices 202 may be triggered if at least one of the first and second USB data lines 226, 228 go to a high state. At that point, the one or more processing devices may poll the first and second USB data lines 226, 228 to confirm that a USB peripheral device is connected to the medical device 200.

The medical device 200 may be configured to determine whether an attached USB peripheral device, such as the USB peripheral device 118, is drawing power from, e.g., a particular USB port of the medical device 200.

For example, in some implementations, the one or more processing devices 202 may monitor the output 210 of the current detection circuit 206. In an implementation, the current detection circuit 206 is configured to go to a "high" state (e.g., outputting a "1" at the output 210) when power is being drawn from the USB port 214 by a USB peripheral device connected to the USB port 214. In an implementation, the current detection circuit 206 is configured to go to a "low" state (e.g., outputting a "0" at the output 210) when no power (or appreciably no power) is being drawn from the USB port 214, so that, e.g., a self-powered USB peripheral device is connected to the USB port 214, or no USB peripheral device is connected to the USB port 214 at all.

In other implementations, the current detection circuit 206 may provide an analog voltage output signal, rather than a digital output signal to the one or more processing devices 202. The analog voltage output by the current detection circuit 206 may be proportional to the current measured by the circuit 206. In such implementations, the one or more processing devices 202 may include an analog to digital converter to convert the analog voltage output signals from the current detection circuit 206 to digital signals for further processing by the one or more processing devices 202.

In an implementation, the medical device 200 may generally determine whether a USB peripheral device is actually connected to the medical device 200 prior to determining whether power is being drawn from a particular USB port (or ports). Since the medical device 200 may, e.g., send an indication upon determining that power is not being drawn from a particular USB port (or ports), and this condition (the absence of a power draw) may be due to no USB peripheral device being connected in the first place, the medical device 200 may generally first confirm that a USB peripheral device is actually connected.

The one or more processing devices 202 may include a processing device dedicated to performing the tasks of, e.g., monitoring the USB data lines 226, 228 and the output 210 of the current detection circuit 206. The one or more processing devices 202 may include a processing device that performs other tasks in addition to, e.g., monitoring the USB data lines 226, 228 and the output 210 of the current detection circuit 210. The one or more processing devices 202 may include a microprocessor, such as a standard personal computer (PC) compatible processor, embedded within the medical device 200. In some implementations, the microprocessor may be configured to perform functions other than medical procedure related functions of the medical device 200. In some implementations, the microprocessor may be, e.g., custom designed to control, operate and/or monitor some or all medical procedure functions of the medical device 200.

In some implementations, the one or more processing devices 202 are configured to provide an indication 234 to, e.g., a display and/or user interface (such as the display and/or user interface 126), or an audio speaker, or some other entity on the medical device 200, via a signal line 232.

The indication 234 may be, e.g., an indication of a potentially unsafe condition. The one or more processing devices 202 may be configured to provide the indication 234 if a USB peripheral device (e.g., determined by the one or more processing devices 202 to be connected to the medical device 200) is not drawing power from the medical device 200. The potentially unsafe condition may include, e.g., that the medical device 200 is potentially susceptible to a leakage current from the USB peripheral device. The leakage current may, as described above, present a potential risk to a patient who, e.g., receives medical treatment from the medical device 200. The potentially unsafe condition may include, e.g., that the USB peripheral device may be drawing power from a power supply independent of the medical device 200 and thus presents a potential risk to the patient.

Figure 4:
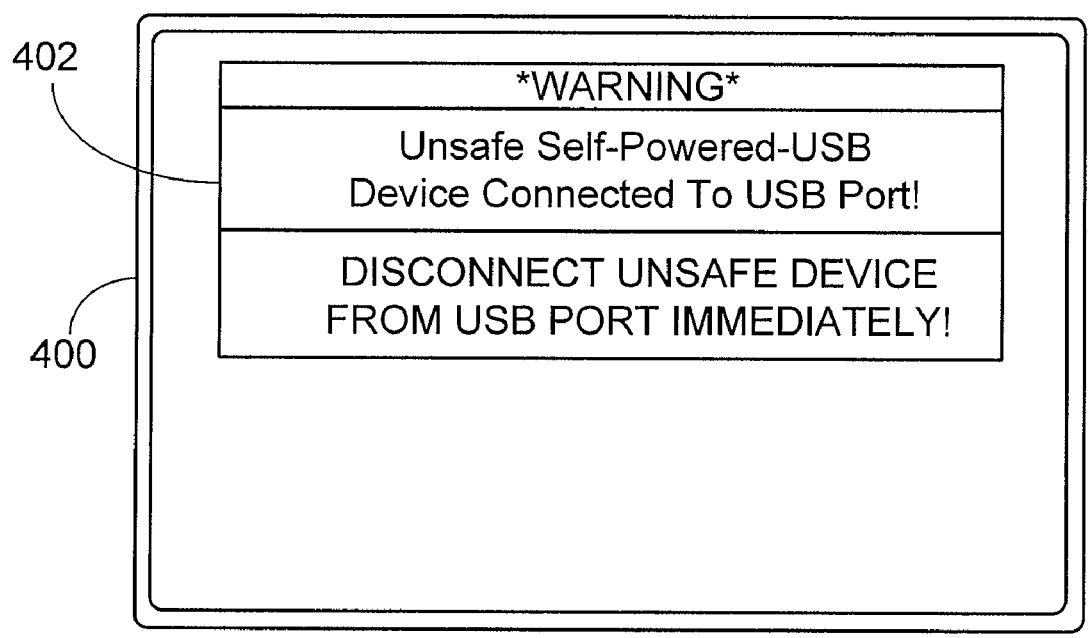
FIG. 4 is a diagram of an example medical device user interface.

The one or more processing devices 202 may provide the indication 234 by displaying a warning message on a display and/or user interface (such as the display and/or user interface 126). An example warning message is shown in FIG. 4 and is described in more detail below. The one or more processing devices 202 may provide the indication 234 by triggering an alarm. An alarm may include, e.g., an alarm sound or a synthetic voice being played through an audio speaker on the medical device 200.

Figure 3:
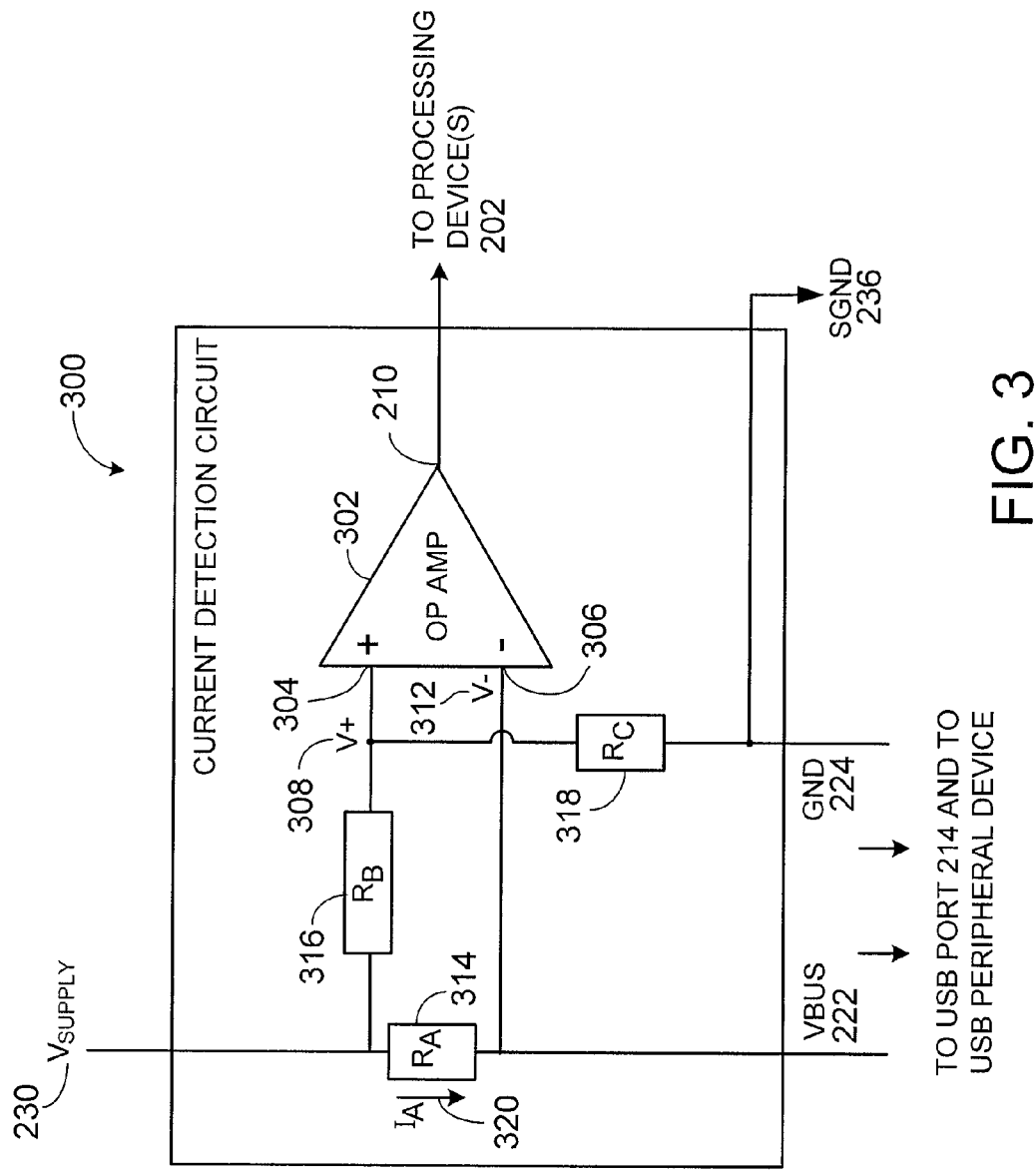
FIG. 3 is a diagram of an example current detection circuit.

FIG. 3 is a diagram of an example implementation 300 of the current detection circuit 206 of FIG. 2. The current detection circuit 300 includes an operational amplifier ("op-amp") 302 having the output 210 of FIG. 2 (connected to the one or more processing devices 202 via the connection 212), a positive input ("+") 304, and a negative input ("−") 306. The current detection circuit 300 also includes three resistors $R_A$ 314, $R_B$ 316, and $R_C$ 318.

The current detection circuit 300 receives the power supply voltage $V_{SUPPLY}$ 230 and is connected to the signal ground SGND 236 of FIG. 2. The current detection circuit 300 is connected to the USB port 214 of FIG. 2 via the signal lines VBUS 222 and GND 224. The signal ground line GND 224 may be connected to the signal ground SGND 236, e.g., within the current detection circuit 300. The resistor $R_A$ 314 is connected between the power supply voltage $V_{SUPPLY}$ 230 and the negative input 306 of the op-amp 302; the resistor $R_B$ 316 is connected between the power supply voltage $V_{SUPPLY}$ 230 and the positive input 304 of the op-amp 302; and the resistor $R_C$ 318 is connected between the signal ground SGND 326 and the positive input 304 of the op-amp 302. A current $I_A$ is shown going through the resistor $R_A$ 314.

The resistors $R_B$ 316 and $R_c$ 318 together form a voltage divider between the power supply voltage $V_{SUPPLY}$ 230 and the signal ground SGND 326 and act to set a voltage V+ 308 on the positive input 304 of the op-amp 302.

The op-amp 302 is configured to go to a "high" state (e.g., outputting a "1" at the output 210) when the voltage V+ 308 at the positive input 304 exceeds a voltage V− 312 at the negative input 306 of the op-amp 302. The op-amp 302 is configured to go to a "low" state (e.g., outputting a "0" at the output 210) when the voltage V+ 308 at the positive input 304 is less than the voltage V− 312 at the negative input 306.

In an implementation, the op-amp 302 may be configured to have a very low offset voltage (and current), so that the op-amp 302 is capable of detecting a small voltage drop across the resistor $R_A$ 314 without giving a false detect (e.g., outputting a "1" at the output 210, indicating that power is being drawn by the USB peripheral device when in fact power is not being drawn). For example, the op-amp 302 may be configured to be able to measure a current as low as 5 milliamperes (mA), although this is an example value and other values and ranges may be used. In an implementation, the resistor $R_A$ 314 is designed to have a relatively low resistance when compared with the resistors $R_B$ 316 and $R_c$ 318. In an implementation, the resistor $R_B$ 316 is designed to have a relatively low resistance when compared with the resistor $R_c$ 318. For example, in an implementation, the resistor $R_A$ 314 may be 0.5 Ohms (Ω), the resistors $R_B$ 316 may be 2Ω, and the resistor $R_c$ 318 may be 11,000Ω (11 kΩ). Of course, other resistor values may be used. The current $I_A$ drawn through the resistor $R_A$ 314 by the USB peripheral device (e.g., USB peripheral device 118) (if the device is attached to the USB port 214 and is drawing power) will often be very low because USB peripheral devices that draw power from a USB host device (e.g., USB peripheral devices such as some USB memory sticks) typically draw very little current. Moreover, a designer of the current detection circuit 300 may not want to limit the power available to an attached peripheral USB device and may try to minimize the voltage drop across the resistor $R_A$ 314.

For example, assume that the power supply voltage $V_{SUPPLY}$ 230 is 5 volts. The resistors $R_B$ 316 and $R_C$ 318 are selected to set a voltage V+ 308 of 4.97 volts on the positive input of 304 of the op-amp 302. When power is being drawn by a USB peripheral device connected to the USB port 214, the resistor $R_A$ 314 results in a voltage V− 312 of 4.96 volts on the negative input 306 of the op-amp 302. V+ 310 minus V− 312 (4.97 V-4.96 V) is positive (0.01 V), so the op-amp 302 goes to a "high" state (e.g., outputs a "1" at the output 210). When a USB peripheral device connected to the USB port 214 draws no power, there is effectively no voltage drop across the resistor $R_A$ 314, resulting in a voltage V− 312 of 5 volts. V+ 310 minus V− 312 (4.97 V-5V) is negative (−0.03 V), so the op-amp 302 goes to a "low" state (e.g., outputs a "0" at the output 210).

The current detection circuit 300 shown in FIG. 3 is an example implementation 300 of the current detection circuit 206 of FIG. 2, and any of a variety of current detection circuits may be used.

For example, a current monitoring device such as the INA138 High-Side Measurement Current Shunt Monitor from Texas Instruments® Corporation may be used as a current detection circuit. The INA138 would measure current and would output an analog voltage signal that is proportional to the current measure by the INA 138. As described above, in such an implementation, the one or more processing devices 202 of FIG. 2 may include an analog to digital converter to convert the analog voltage output signals from the current detection circuit to digital signals for further processing by the one or more processing devices 202.

FIG. 4 is a diagram of an example medical device user interface, e.g., an example implementation 400 of the display and/or user interface 126 of the medical device 106 of FIG. 1A. The user interface 400 shows a text box 402 (e.g., a flashing text box) that displays a warning indicative of a self-powered USB peripheral device being connected to a USB port (e.g., USB port 214 of FIG. 2) on the medical device 106. The example warning displayed in the text box is "*WARNING* Unsafe Self-Powered USB Device Connected To USB Port!—DISCONNECT UNSAFE DEVICE FROM USB PORT IMMEDIATELY!" Of course, this warning is merely an example, and any number of other warnings may be used. In some implementations, the warning may be accompanied by, e.g., an alarm sound or a synthetic voice being played through an audio speaker on the medical device 106.

Figure 5:
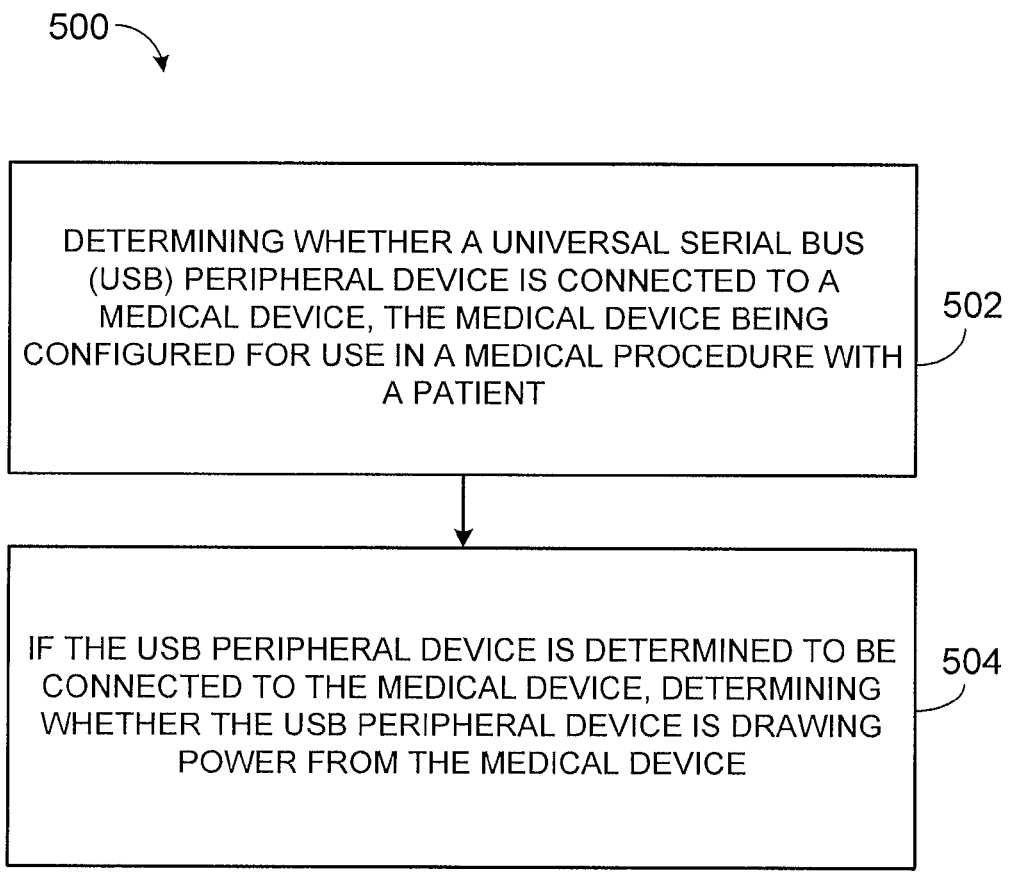
FIGS. 5-10 are flow diagrams showing example processes.

FIG. 5 is a flow diagram showing an example process 500 of one or more user interface processing devices such as, e.g., the one or more user processing devices 202 of the example medical device 200 of FIG. 2. Processing begins, for example, where the one or more user processing devices 202 determine (502) whether a USB peripheral device (e.g., USB peripheral device 118 of FIG. 1A) is connected to the medical device 200. The medical device 200 may be configured for use in a medical procedure with a patient.

If the USB peripheral device is determined to be connected to the medical device 200, the one or more user processing devices 202 determine (504) whether the USB peripheral device is drawing power from the medical device 200.

Figure 6:
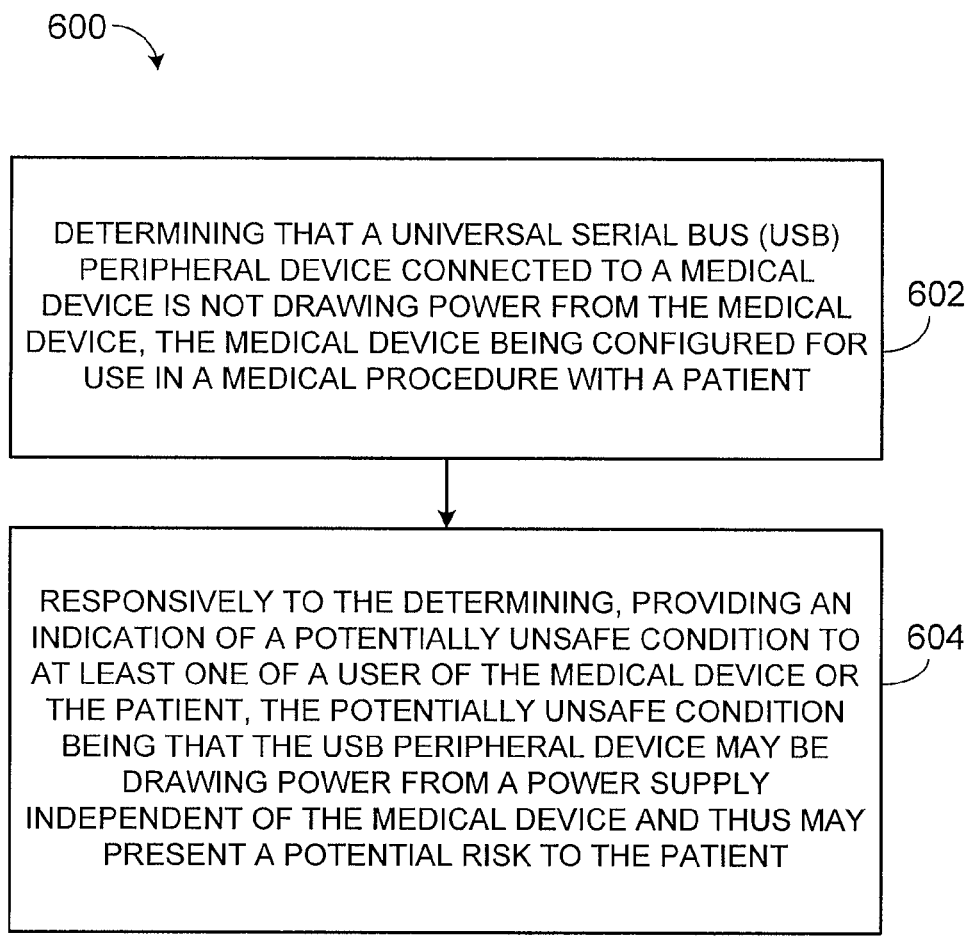

FIG. 6 is a flow diagram showing an example process 600 of one or more user interface processing devices such as, e.g., the one or more user processing devices 202 of the example medical device 200 of FIG. 2. Processing begins, for example, where the one or more user processing devices 202 determine (602) that a USB peripheral device (e.g., USB peripheral device 118 of FIG. 1A) connected to the medical device 200 is not drawing power from the medical device 200. The medical device 200 may be configured for use in a medical procedure with a patient.

Responsively to the determining, the one or more user processing devices 202 provide (604) an indication (e.g., the indication 234 of FIG. 2) of a potentially unsafe condition to at least one of a user of the medical device 200 or the patient. The potentially unsafe condition may be that the USB peripheral device may be drawing power from a power supply (e.g., external power supply 124) independent of the medical device 200 and thus may present a potential risk to the patient.

Figure 7:
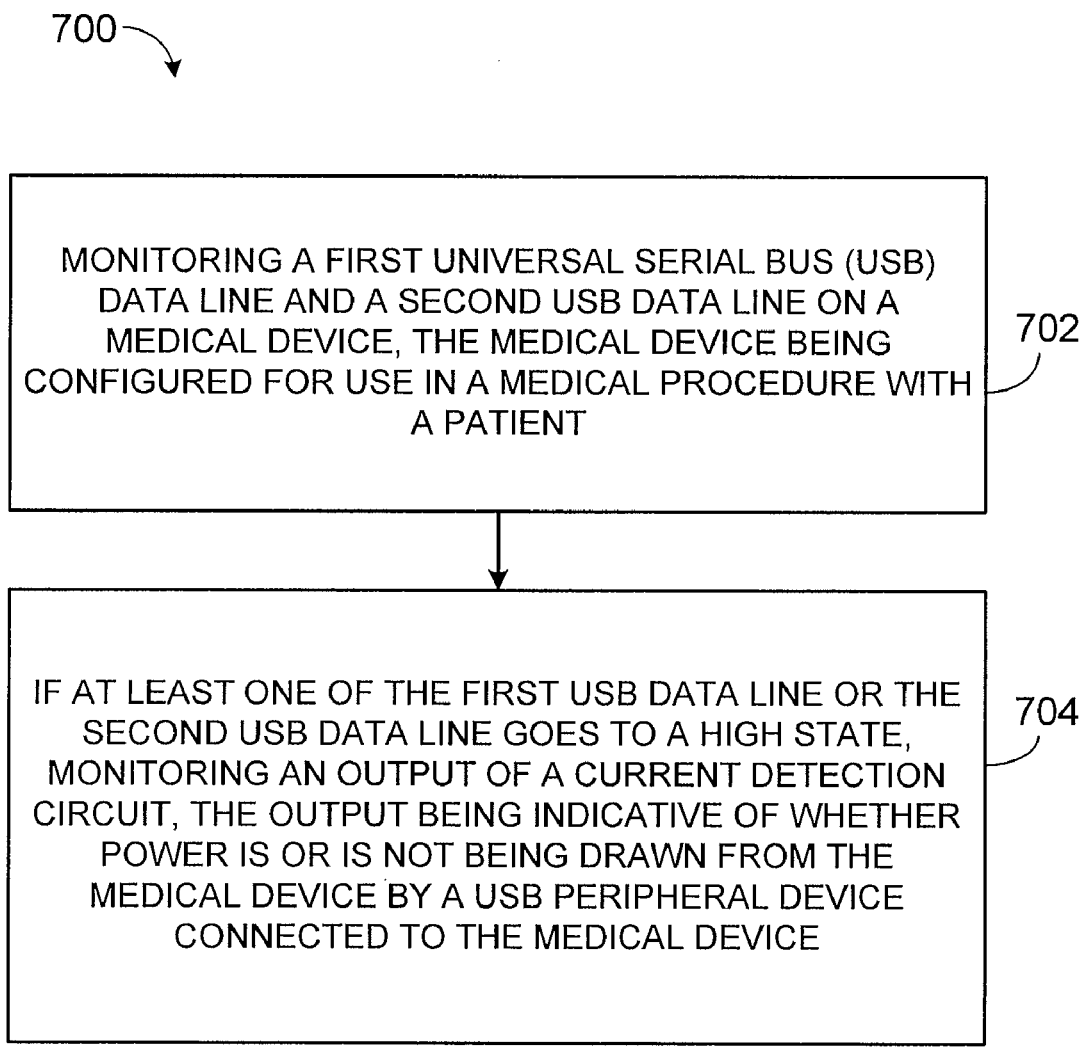

FIG. 7 is a flow diagram showing an example process 700 of one or more user interface processing devices such as, e.g., the one or more user processing devices 202 of the example medical device 200 of FIG. 2. Processing begins, for example, where the one or more user processing devices 202 monitor (702) a first USB data line (e.g., USB data line D+ 226 of FIG. 2) and a second USB data line (e.g., USB data line D− 228 of FIG. 2) on the medical device 200. The medical device 200 may be configured for use in a medical procedure with a patient.

If at least one of the first USB data line or the second USB data line goes to a "high" state, an output (e.g., the output 210) of a current detection circuit (such as, e.g., the current detection circuit 206 of FIG. 2) is monitored (704). The output may be indicative of whether power is or is not being drawn from the medical device 200 by a USB peripheral device (e.g., USB peripheral device 118 of FIG. 1A) connected to the medical device 200. When the USB peripheral device is connected to the medical device 200, the first and second USB data lines may generally be connected to respective data lines from the USB peripheral device.

Figure 8:
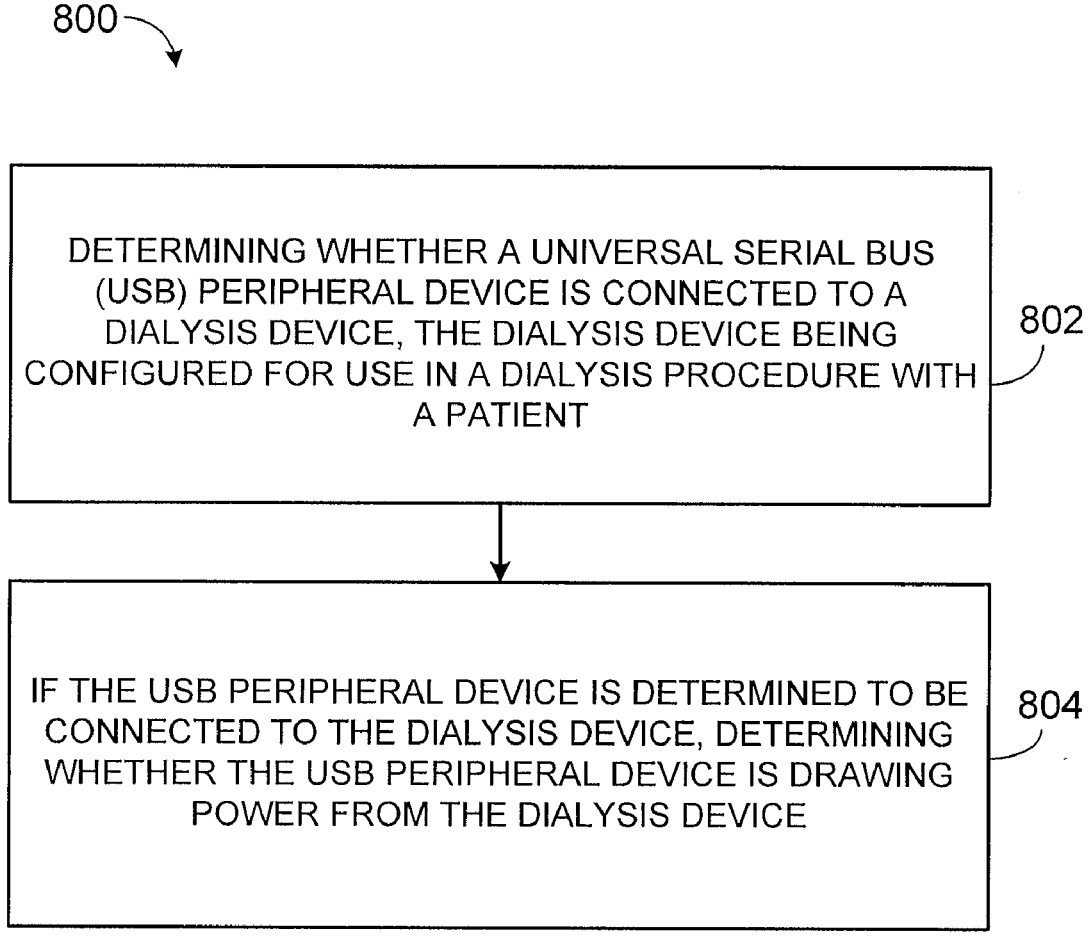

FIG. 8 is a flow diagram showing an example process 800 of one or more user interface processing devices such as, e.g., the one or more user processing devices 202 of the example medical device 200 of FIG. 2, where, here, the medical device 200 is a dialysis device, e.g., the HD device 106-H of FIG. 2. Processing begins, for example, where the one or more user processing devices 202 determine (802) whether a USB peripheral device (e.g., USB peripheral device 118 of FIG. 1B) is connected to the dialysis device. The dialysis device may be configured for use in a dialysis procedure with a patient.

If the USB peripheral device is determined to be connected to the dialysis device, the one or more user processing devices 202 determine (804) whether the USB peripheral device is drawing power from the dialysis device.

Figure 9:
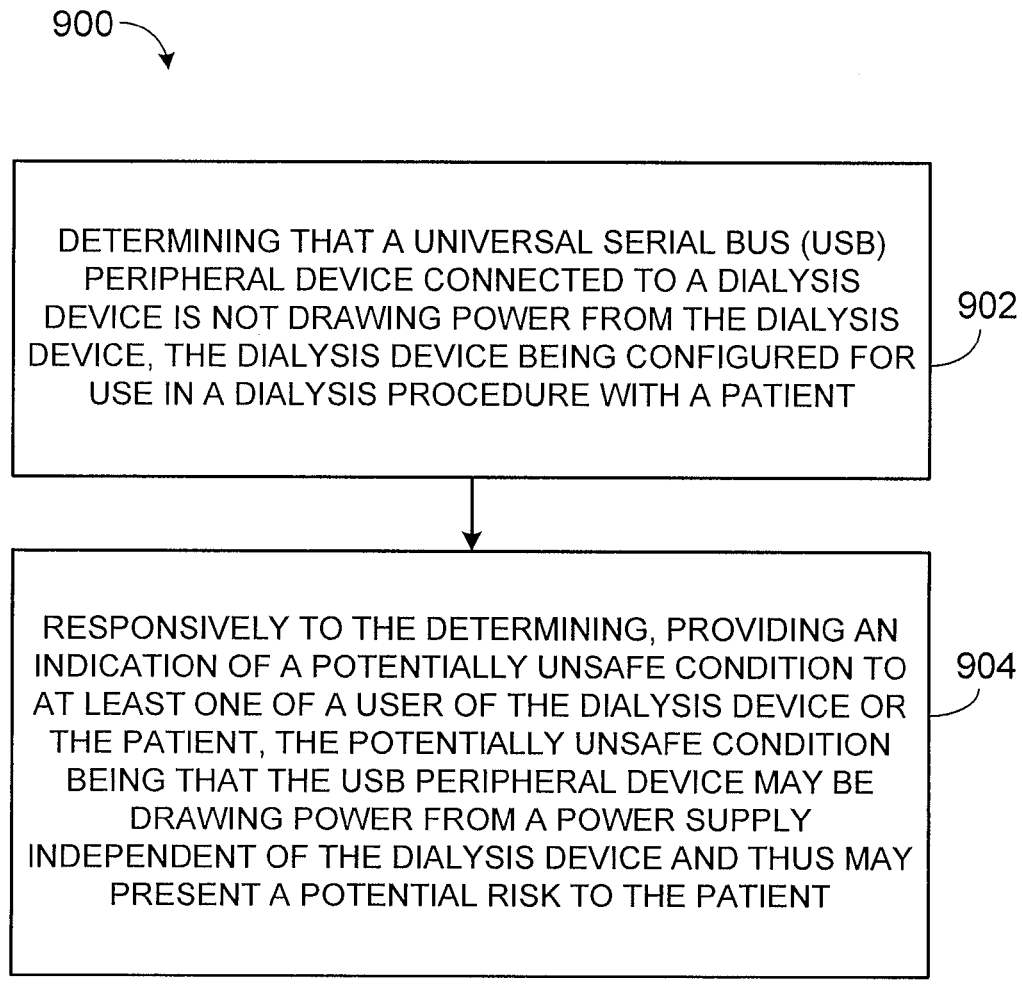

FIG. 9 is a flow diagram showing an example process 900 of one or more user interface processing devices such as, e.g., the one or more user processing devices 202 of the example medical device 200 of FIG. 2, where, here, the medical device 200 is a dialysis device, e.g., the HD device 106-H of FIG. 2.

Processing begins, for example, where the one or more user processing devices 202 determine (902) that a USB peripheral device (e.g., USB peripheral device 118 of FIG. 1B) connected to the dialysis device is not drawing power from the dialysis device. The dialysis device may be configured for use in a dialysis procedure with a patient.

Responsively to the determining, the one or more user processing devices 202 provide (904) an indication (e.g., the indication 234 of FIG. 2) of a potentially unsafe condition to at least one of a user of the dialysis device or the patient. The potentially unsafe condition may be that the USB peripheral device may be drawing power from a power supply (e.g., external power supply 124) independent of the dialysis device and thus may present a potential risk to the patient.

Figure 10:
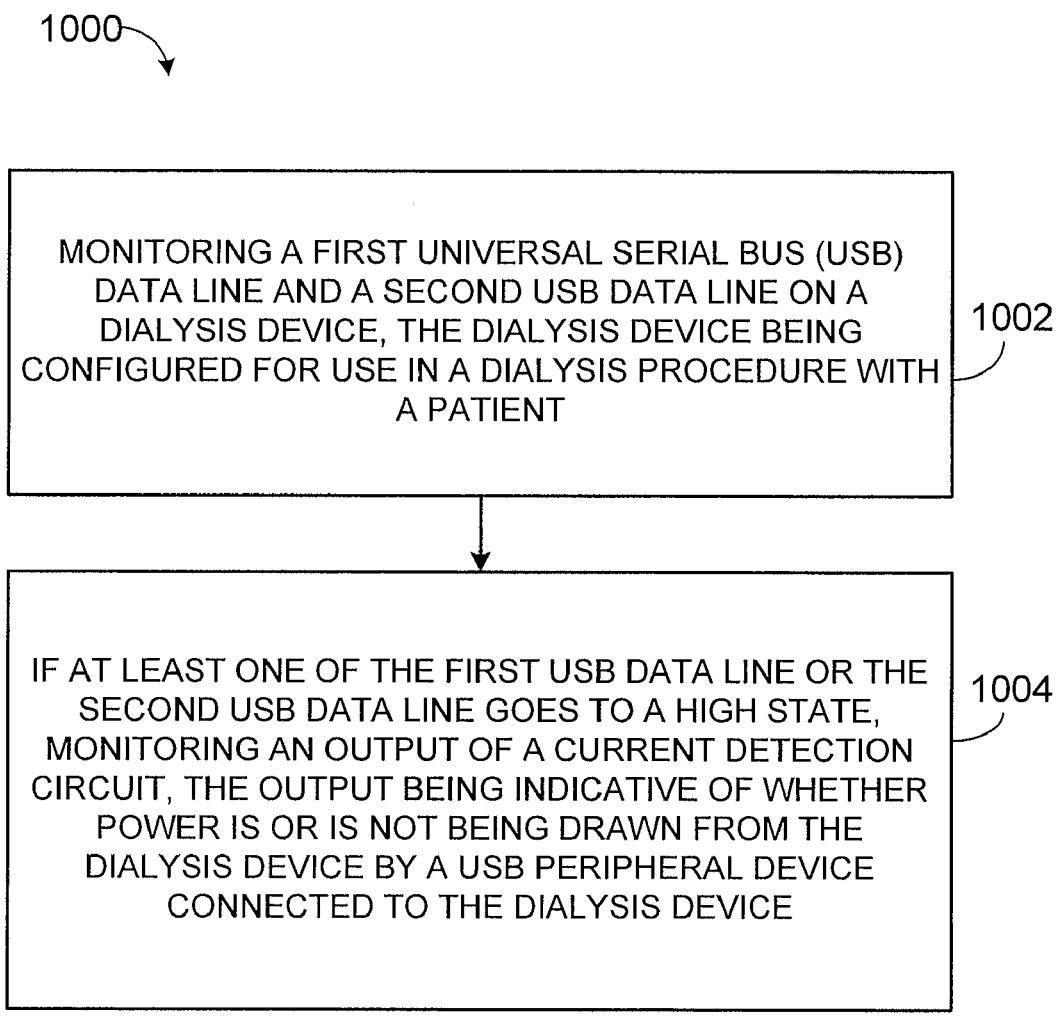

FIG. 10 is a flow diagram showing an example process 1000 of one or more user interface processing devices such as, e.g., the one or more user processing devices 202 of the example medical device 200 of FIG. 2, where, here, the medical device 200 is a dialysis device, e.g., the HD device 106-H of FIG. 2. Processing begins, for example, where the one or more user processing devices 202 monitor (1002) a first USB data line (e.g., USB data line D+ 226 of FIG. 2) and a second USB data line (e.g., USB data line D− 228 of FIG. 2) on the dialysis device. The dialysis device may be configured for use in a dialysis procedure with a patient.

If at least one of the first USB data line or the second USB data line goes to a "high" state, an output (e.g., the output 210) of a current detection circuit (such as, e.g., the current detection circuit 206 of FIG. 2) is monitored (1004). The output may be indicative of whether power is or is not being drawn from the dialysis device by a USB peripheral device (e.g., USB peripheral device 118 of FIG. 1B) connected to the dialysis device. When the USB peripheral device is connected to the dialysis device, the first and second USB data lines may generally be connected to respective data lines from the USB peripheral device.

Figure 11:
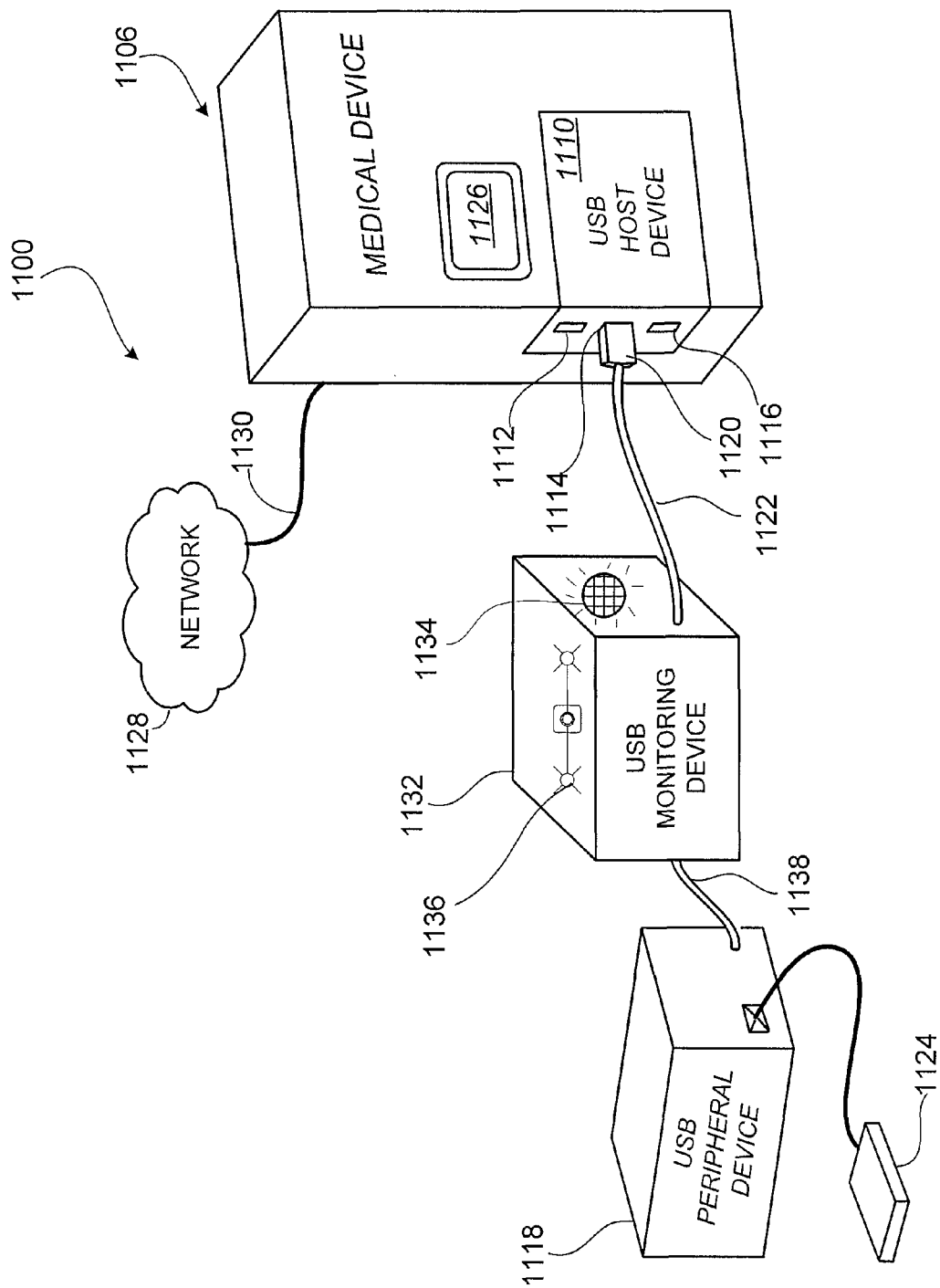
FIG. 11 is a diagram showing an example of a patient care environment that includes an example medical device and a USB monitoring device.

While medical device 106 has been described as including an integral monitoring device, separate monitoring devices can alternatively be used. For example, medical devices that are not configured to monitor USB connections can be retrofitted with a separate monitoring device (e.g., the monitoring device could be an "off-the-shelf" component that is capable of being used with variety of medical devices). FIG. 11 shows such an arrangement. Referring to FIG. 11, exemplary system 1100 of medical devices that includes an example medical device 1106. The medical device 1106 may for example, be any of the various types of medical devices (e.g., HD machine, PA machine, etc. . . . ) discussed above with regard to medical device 106. The medical device 1106 may include a display and/or user interface 1126 at which, e.g., information regarding the medical procedure and/or a patient may be displayed. The display and/or user interface 1126 may include a touch screen at which data may be, e.g., entered by an operator of the medical device (e.g., a health care practitioner (HCP) such as, e.g., a doctor, a nurse, a patient care technician, or a home health aide). The medical device 1106 may include other user interface devices such as, e.g., a keyboard or pointing device. The medical device 1106 may be configured to communicate with an external network 1128, such as a local-area network or the Internet, via a wired or wireless connection 1130.

The medical device 1106 may include one or more processing devices. The one or more processing devices may be used to manage and oversee the functions of the medical procedure and to, for example, monitor, analyze and interpret patient vital signs and medical procedure parameters during the medical procedure.

The medical device 1106 includes a USB host device 1110. In some implementations, the USB host device 1110 may be considered to be coextensive with the medical device 1106 so that, e.g., the USB host device 1110 may be the medical device 1106 itself. In other implementations, the medical device 1106 may include, e.g., one or more devices connected to one another, with one of the devices including the USB host device 1110.

In some implementations, the USB host device 1110 (and thus the medical device 1106) may include one or more USB ports configured to receive USB connectors from USB peripheral devices. The USB host device 1110 of the medical device 1106 may include three USB ports 1112, 1114, 1116, as shown in FIG. 11. In some implementations, the connection 1130 to the external network 1128 may be wired and be plugged into one of the USB ports 1112, 1114, 1116.

As discussed above, while some USB peripheral devices (e.g., USB flash memory sticks) draw power solely from the USB host devices to which they are connected, other USB peripheral devices may be powered by their own external power supplies and may draw no power from the USB host devices to which they are connected.

The system 1100 shown in FIG. 11 includes a USB monitoring device 1132. While only one USB monitoring device is shown, systems can include any number of USB monitoring devices. The USB monitoring device 1132 is connected to the USB port 1114 of the USB host device 1110 via a cord 1122 and a USB connector 1120.

The USB monitoring device 1132 allows power to be drawn therethrough from 1106 to 1118. As discussed below, the USB monitoring device 1132 emits a warning if it is determined that the USB peripheral device 1118 is powered by its own external power supply 1124 and draws no power from the USB host device 1110 of the medical device 1106. The peripheral device 1118 is connected to the USB monitoring device 1132 via cord 1138. The USB monitoring device 1132 can also be connected to more than one USB peripheral device via a USB hub circuit (shown in FIG. 12), even though only one USB peripheral device is shown in FIG. 11.

The USB monitoring device 1132 can include one or more status lights 1136, one or more speakers 1134, or a combination of status lights and speakers. In implementations that include a warning light, there could be one light, or a light that corresponds to each USB receptacle (if there is more than one receptacle).

Figure 12:
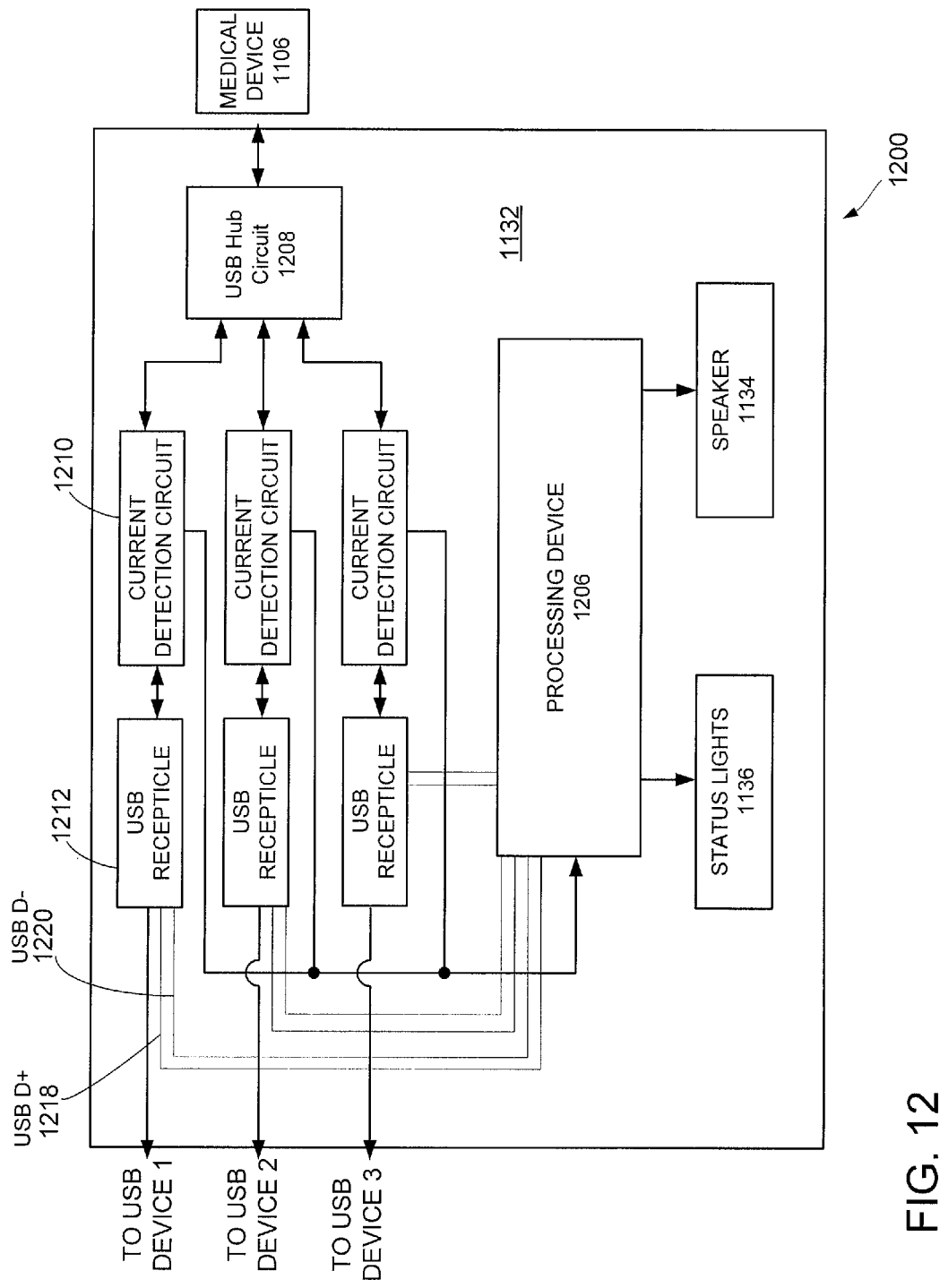
FIG. 12 is a diagram showing an example of a USB monitoring device connected to a medical device.

FIG. 12 shows an exemplary system 1200 that includes a USB monitoring device 1132 and a medical device 1106. The USB monitoring device 1132 contains a processing device 1206 for monitoring the USB receptacles 1212 on the USB monitoring device 1132. The USB monitoring device 1132 also includes current detection circuits 1210 that incorporate the circuit described above (see, e.g., FIG. 3).

In this example, the USB monitoring device 1132 draws power from the medical device 1106 to both power itself and any peripherals connected to its USB receptacles. A USB hub circuit 1208 may also be included in the USB monitoring device 1132 to provide multiple protected USB connections to the medical device 1106.

The processing device 1206 is configured to detect an "unsafe condition" on any one of the USB peripherals connected to it. Upon detection of an unsafe condition, the processing device 1206 will alert the operator with an optical indication via status lights 1136 and/or an audible warning via speaker 1134.

The processing device 1206 monitors the power draw of the USB ports and also monitors the USB data lines 1218 and 1220 of each USB data receptacle 1212 (not all data lines and receptacles are labeled in the example of FIG. 12). When no peripheral is attached to a USB host (or USB hub circuit 1208), the USB data lines 1218 and 1220 (D+ and D−) are both at the low (0) state. When a peripheral is connected, one of the two lines will go to the high (1) state. The determination of which data line goes high is determined by the speed of the USB device (low, norm or high). The processing device 1206 also monitors the two USB data lines 1218 and 1220 and, when one of the lines goes high, it will check if power is being drawn by the peripheral from the host system. If power is drawn, then the device is powered from the medical device 1106 and does not present a safety issue. If no power is drawn with the USB peripheral device connected (not shown), the processing device 1206 may then alert the operator of the unsafe condition using one or both of the status lights 1136 and the speaker 1134.

Figure 13:
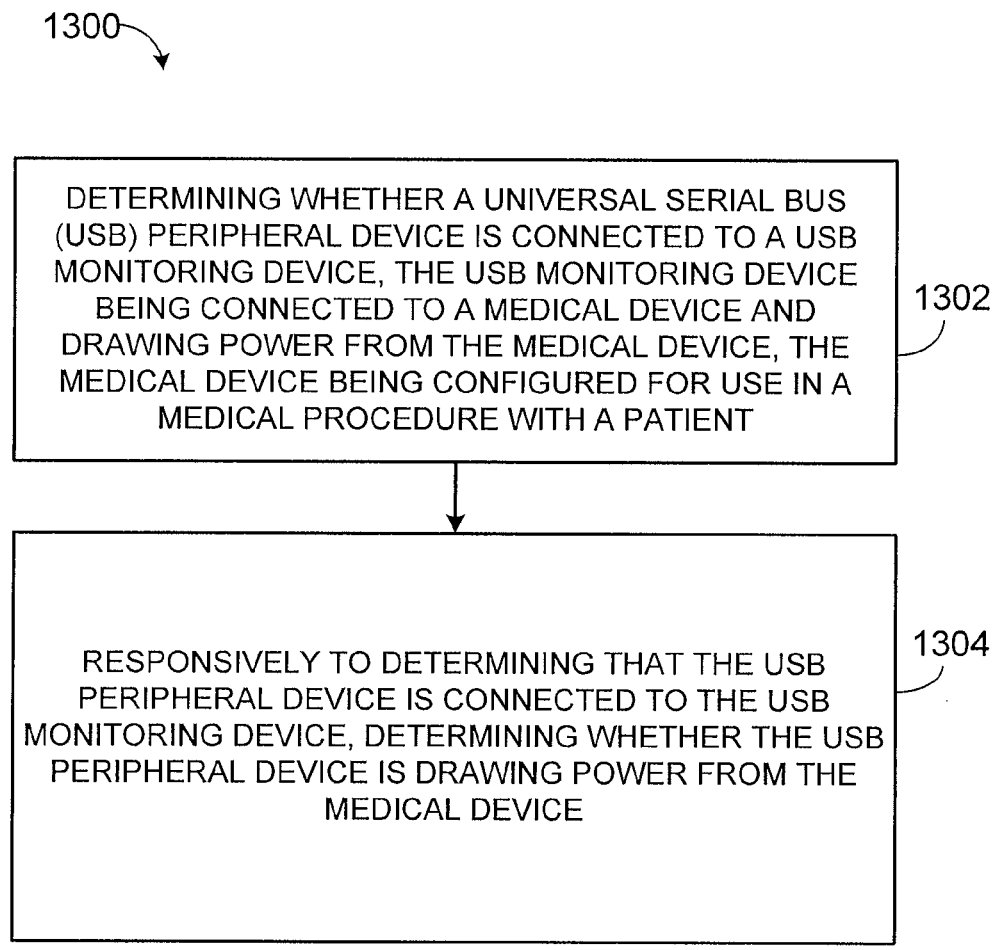
FIG. 13 is a flow diagram showing an example process.

FIG. 13 is a flow diagram showing an example process 1300 of one or more USB monitoring devices such as, e.g., the one or more USB monitoring devices 1132 of FIG. 11. Processing begins, for example, where the one or more USB monitoring devices determine (1302) whether a universal serial bus peripheral device (e.g., USB peripheral device 1118 of FIG. 11) is connected to a USB monitoring device, the USB monitoring device being connected to a medical device (e.g., medical device 1106 of FIG. 11) and drawing power from the medical device, the medical device being configured for use in a medical procedure with a patient.

Responsively to determining that the USB peripheral device is connected to the USB monitoring device, the USB monitoring device determines (1304) whether the USB peripheral device is drawing power from the medical device.

Although the techniques described herein have been explained with reference to USB ports, USB peripheral devices, etc., the techniques may be applied to other serial data port technologies, such as the IEEE (Institute of Electrical and Electronics Engineers, Inc.) 1394 High Performance Serial Bus (e.g., FireWire® of Apple® Corporation, i.LINK® of Sony® Corporation, and OHCI-Lynx® of Texas Instruments® Corporation).

Some connections may be wired and/or wireless connections. When one component is said to be connected to another component, the component may be directly connected or indirectly connected (via, e.g., still another component) to the other component.

The processes described herein and their various modifications (hereinafter "the processes"), are not limited to the hardware and software described above. All or part of the processes can be implemented, at least in part, via a computer program product, e.g., a computer program tangibly embodied in an information carrier, such as one or more computer-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subrouting, or other unit suitable for use in a computing environment. A computer program can be deployed to be executed on one computer or on multiple computers at one site or distributed across multiple sites and interconnected by a network.

Actions associated with implementing all or part of the processes can be performed by one or more programmable processing devices executing one or more computer programs to perform the functions of the processes. All or part of the processes can be implemented as, special purpose logic circuitry, e.g., an FPGA (field programmable gate array) and/or an ASIC (application-specific integrated circuit).

Processing devices suitable for the execution of a computer program include, by way of example, both general and special purpose microprocessors, and any one or more processors of any kind of digital computer. Generally, a processing device will receive instructions and data from a read-only memory or a random access memory or both. Components of a computer include one or more processing devices for executing instructions and one or more memory devices for storing instructions and data.

Components of different implementations described herein may be combined to form implementations not specifically set forth above. Other implementations not specifically described are also within the scope of the following claims.

What is claimed is:

1. A method, comprising:
   determining whether a universal serial bus (USB) peripheral device is connected to a USB monitoring device, the USB monitoring device being connected to a medical device and drawing power from the medical device, the medical device being configured for use in a medical procedure with a patient; and
   if the USB peripheral device is determined to be connected to the USB monitoring device, determining whether the USB peripheral device is drawing power from the medical device; and
   if the USB peripheral device is determined to not be drawing power from the medical device, providing an indication of a potentially unsafe condition, the potentially unsafe condition being that the USB peripheral device may be drawing power from a power supply independent of the medical device and thus may present a potential risk to the patient.

2. The method of claim 1, further comprising:
   if the USB peripheral device is determined to not be drawing power from the medical device, activating an alarm.

3. The method of claim 2, wherein activating the alarm comprises at least one of the following:
   displaying a warning light on the USB monitoring device; or
   triggering an audible alarm on the USB monitoring device.

4. The method of claim 2, wherein activating the alarm comprises:
   triggering an audible alarm on the medical device; or
   causing a warning message to be displayed on a user interface, the medical device comprising the user interface.

5. The method of claim 1, further comprising:
   if the USB peripheral device is determined to not be drawing power from the medical device, electrically isolating the USB peripheral device from the medical device and the patient.

6. The method of claim 5, wherein electrically isolating the USB peripheral device from the medical device and the patient comprises:
   disconnecting one or more signal lines connected to a USB port of the USB monitoring device, the USB port configured to receive a USB connector of the USB peripheral device.

7. The method of claim 6, wherein the one or more signal lines comprise a first USB data line, a second USB data line, a USB power line, and a USB ground line.

8. The method of claim 1, wherein the medical device comprises a USB host device capable of providing power to the USB monitoring device and the USB peripheral device, the USB monitoring device comprising a first USB connector and the USB peripheral device comprising a second USB connector, the USB host device comprising a first USB port to receive the first USB connector, the USB monitoring device comprising a second USB port to receive the second USB connector so that the USB peripheral device can be connected to the USB monitoring device.

9. The method of claim 1, wherein the USB monitoring device comprises:
   a first USB port to receive a first USB connector of the USB peripheral device;
   a second USB port to receive a second USB connector of a second USB peripheral device; and
   a USB hub circuit configured to receive power from the medical device and to distribute power to the first USB peripheral device and the second USB peripheral device.

10. The method of claim 8, wherein the USB monitoring device further comprises:
    a first current detection circuit connected between the first USB port and the USB hub circuit; and
    a second current detection circuit connected between the second USB port and the USB hub circuit.

11. The method of claim 1, wherein the USB monitoring device comprises one or more processing devices.

12. The method of claim 11, wherein determining whether the USB peripheral device is connected to the USB monitoring device comprises:
    monitoring a first USB data line and a second USB data line using the one or more processing devices; and
    if at least one of the first USB data line or the second USB data line goes to a high state, determining that the USB peripheral device is connected to the USB monitoring device.

13. The method of claim 11, wherein determining whether the USB peripheral device is connected to the USB monitoring device comprises:
    triggering an interrupt of the one or more processing devices if at least one of a first USB data line or a second USB data line goes to a high state.

14. The method of claim 13, wherein determining whether the USB peripheral device is connected to the USB monitoring device further comprises:
    polling the first USB data line and the second USB data line using the one or more processing devices to confirm that the USB peripheral device is connected to the USB monitoring device.

15. The method of claim 11, wherein determining whether the USB peripheral device is drawing power from the medical device comprises:
    monitoring an output of a current detection circuit using the one or more processing devices, the USB monitoring device comprising the current detection circuit; and
    if the output is at a low state, determining that the USB peripheral device is not drawing power from the medical device.

16. The method of claim 15, wherein the current detection circuit comprises:
    an operational amplifier, the operational amplifier comprising a positive input, a negative input, and the output of the current detection circuit;
    a first resistor connected between a power supply and the positive input;
    a second resistor connected between a signal ground and the positive input, the first and the second resistors forming a voltage divider between the power supply and the signal ground; and a third resistor connected between the power supply and the negative input.

17. The method of claim 16, wherein the power supply comprises a power supply of the USB monitoring device and the signal ground comprises a signal ground of the USB monitoring device.

18. The method of claim 17, wherein the power supply of the USB monitoring device comprises a power supply of the medical device or a power supply that draws power from the power supply of the medical device.

19. The method of claim 16, wherein the output is at a low state when a first voltage at the positive input is less than a second voltage at the negative input.

20. The method of claim 1, wherein the medical procedure comprises hemodialysis and the medical device comprises a hemodialysis device.

21. The method of claim 1, wherein the medical procedure comprises an extracorporeal medical procedure in which a portion of blood is removed from the patient, the portion of the blood is processed by the medical device, and at least some of the portion of blood is subsequently returned to the patient.

22. The method of claim 1, wherein the medical procedure comprises peritoneal dialysis and the medical device comprises a peritoneal dialysis device.

23. A universal serial bus (USB) monitoring device, comprising:
a memory, the memory configured to store instructions for execution; and
one or more processing devices configured to execute the instructions, the instructions for causing the one or more processing devices to:
determine whether a USB peripheral device is connected to the USB monitoring device, the USB monitoring device being configured to be connected to a medical device and being configured to draw power from the medical device, the medical device being configured for use in a medical procedure with a patient; and
if the USB peripheral device is determined to be connected to the USB monitoring device, determine whether the USB peripheral device is drawing power from the medical device; and
if the USB peripheral device is determined to not be drawing power from the medical device, providing an indication of a potentially unsafe condition, the potentially unsafe condition being that the USB peripheral device may be drawing power from a power supply independent of the medical device and thus may present a potential risk to the patient.

24. The USB monitoring device of claim 23, wherein the instructions further comprise instructions for causing the one or more processing devices to:
if the USB peripheral device is determined to not be drawing power from the medical device, activating an alarm.

25. The USB monitoring device of claim 23, wherein the instructions further comprise instructions for causing the one or more processing devices to:
if the USB peripheral device is determined to not be drawing power from the medical device, electrically isolate the USB peripheral device from the medical device and the patient.

26. The USB monitoring device of claim 23, wherein the medical device comprises a USB host device capable of providing power to the USB peripheral device, the USB peripheral device comprising a USB connector, the USB host device comprising a USB port to receive the USB connector so that the USB peripheral device can be connected to the medical device, the USB host device comprising the memory and the one or more processing devices.

27. The USB monitoring device of claim 23, wherein determining whether the USB peripheral device is connected to the USB monitoring device comprises:
monitoring a first USB data line and a second USB data line; and
if at least one of the first USB data line or the second USB data line goes to a high state, determining that the USB peripheral device is connected to the USB monitoring device.

28. The USB monitoring device of claim 23, further comprising:
a current detection circuit; and
wherein determining whether the USB peripheral device is drawing power from the medical device comprises:
monitoring an output of the current detection circuit; and
if the output is at a low state, determining that the USB peripheral device is not drawing power from the medical device.

29. The USB monitoring device of claim 28, wherein the current detection circuit comprises:
an operational amplifier, the operational amplifier comprising a positive input, a negative input, and the output of the current detection circuit;
a first resistor connected between a power supply of the medical device and the positive input;
a second resistor connected between a signal ground of the medical device and the positive input, the first and the second resistors forming a voltage divider between the power supply and the signal ground; and
a third resistor connected between the power supply and the negative input.

30. The USB monitoring device of claim 23, wherein the medical procedure comprises hemodialysis and the medical device comprises a hemodialysis device.

31. The USB monitoring device of claim 23, wherein the medical procedure comprises peritoneal dialysis and the medical device comprises a peritoneal dialysis device.

32. One or more computer-readable media storing executable instructions, the one or more computer-readable media comprising tangible media, the instructions for causing one or more processing devices to:
determine whether a universal serial bus (USB) peripheral device is connected to a USB monitoring device, the USB monitoring device comprising the one or more processing devices, the USB monitoring device being configured to be connected to a medical device and being configured to draw power from the medical device, the medical device being configured for use in a medical procedure with a patient; and
if the USB peripheral device is determined to be connected to the USB monitoring device, determine whether the USB peripheral device is drawing power from the medical device; and
if the USB peripheral device is determined to not be drawing power from the medical device, providing an indication of a potentially unsafe condition, the potentially unsafe condition being that the USB peripheral device may be drawing power from a power supply independent of the medical device and thus may present a potential risk to the patient.

33. The one or more computer-readable media of claim 32, wherein the instructions further comprise instructions for causing the one or more processing devices to:

if the USB peripheral device is determined to not be drawing power from the medical device, activating an alarm.

34. The one or more computer-readable media of claim 32, wherein the instructions further comprise instructions for causing the one or more processing devices to:
if the USB peripheral device is determined to not be drawing power from the medical device, electrically isolate the USB peripheral device from the medical device and the patient.

35. The one or more computer-readable media of claim 32, wherein the medical device comprises a USB host device capable of providing power to the USB peripheral device, the USB peripheral device comprising a USB connector, the USB host device comprising a USB port to receive the USB connector so that the USB peripheral device can be connected to the medical device.

36. The one or more computer-readable media of claim 32, wherein determining whether the USB peripheral device is connected to the USB monitoring device comprises:
monitoring a first USB data line and a second USB data line; and
if at least one of the first USB data line or the second USB data line goes to a high state, determining that the USB peripheral device is connected to the USB monitoring device.

37. The one or more computer-readable media of claim 32, wherein determining whether the USB peripheral device is drawing power from the medical device comprises:
monitoring an output of a current detection circuit, the USB monitoring device comprising the current detection circuit; and
if the output is at a low state, determining that the USB peripheral device is not drawing power from the medical device.

38. The one or more computer-readable media of claim 32, wherein the current detection circuit comprises:
an operational amplifier, the operational amplifier comprising a positive input, a negative input, and the output of the current detection circuit;
a first resistor connected between a power supply of the medical device and the positive input;
a second resistor connected between a signal ground of the medical device and the positive input, the first and the second resistors forming a voltage divider between the power supply and the signal ground; and
a third resistor connected between the power supply and the negative input.

39. The one or more computer-readable media of claim 32, wherein the medical procedure comprises hemodialysis and the medical device comprises a hemodialysis device.

40. The one or more computer-readable media of claim 32, wherein the medical procedure comprises peritoneal dialysis and the medical device comprises a peritoneal dialysis device.

41. A method, comprising:
determining that a universal serial bus (USB) peripheral device connected to a USB monitoring device is not drawing power from a medical device, the USB monitoring device being configured to be connected to the medical device and being configured to draw power from the medical device, the medical device being configured for use in a medical procedure with a patient; and
responsively to determining that the USB peripheral device is not drawing power from the medical device:
providing an indication of a potentially unsafe condition, the potentially unsafe condition being that the USB peripheral device may be drawing power from a power supply independent of the medical device and thus may present a potential risk to the patient; and
activating an alarm.

42. A universal serial bus (USB) monitoring device, comprising:
a memory, the memory configured to store instructions for execution; and
one or more processing devices configured to execute the instructions, the instructions for causing the one or more processing devices to:
determine that a USB peripheral device connected to the USB monitoring device is not drawing power from a medical device, the USB monitoring device being configured to be connected to the medical device and being configured to draw power from the medical device, the medical device being configured for use in a medical procedure with a patient; and
responsively to the determining that the USB peripheral device is not drawing power from the medical device:
providing an indication of a potentially unsafe condition, the potentially unsafe condition being that the USB peripheral device may be drawing power from a power supply independent of the medical device and thus may present a potential risk to the patient; and
activating an alarm.

43. A method, comprising:
monitoring a first universal serial bus (USB) data line and a second USB data line on a USB monitoring device, the USB monitoring device being configured to be connected to a medical device and being configured to draw power from the medical device, the medical device being configured for use in a medical procedure with a patient; and
if at least one of the first USB data line or the second USB data line goes to a high state, monitoring an output of a current detection circuit, the output being indicative of whether power is or is not being drawn from the medical device by a USB peripheral device connected to the USB monitoring device; and
if the USB peripheral device is determined to not be drawing power from the medical device, providing an indication of a potentially unsafe condition, the potentially unsafe condition being that the USB peripheral device may be drawing power from a power supply independent of the medical device and thus may present a potential risk to the patient.

44. The method of claim 43, further comprising:
if the output indicates that power is not being drawn from the medical device by the USB peripheral device, performing at least one of the following:
electrically isolating the USB peripheral device from the medical device and the patient; or
activating an alarm.

45. The method of claim 43, wherein the USB monitoring device comprises one or more processing devices.

46. The method of claim 45, wherein monitoring the first USB data line and the second USB data line, and monitoring the output of the current detection circuit comprise:
monitoring the first USB data line and the second USB data line using the one or more processing devices; and
monitoring the output of the current detection circuit using the one or more processing devices.

47. The method of claim 46, wherein the medical device comprises a USB host device capable of providing power to the USB peripheral device, the USB peripheral device comprising a USB connector, the USB host device comprising a USB port to receive the USB connector so that the USB peripheral device can be connected to the medical device.

48. A universal serial bus (USB) monitoring device, comprising:
   a current detection circuit;
   a memory, the memory configured to store instructions for execution; and
   one or more processing devices configured to execute the instructions, the instructions for causing the one or more processing devices to:
      monitor a first USB data line and a second USB data line on the USB monitoring device, the USB monitoring device being configured to be connected to a medical device and being configured to draw power from the medical device, the medical device being configured for use in a medical procedure with a patient; and
      if at least one of the first USB data line or the second USB data line goes to a high state, monitor an output of the current detection circuit, the output being indicative of whether power is or is not being drawn from the medical device by a USB peripheral device connected to the USB monitoring device; and
      if the USB peripheral device is determined to not be drawing power from the medical device, providing an indication of a potentially unsafe condition, the potentially unsafe condition being that the USB peripheral device may be drawing power from a power supply independent of the medical device and thus may present a potential risk to the patient.

49. The USB monitoring device of claim 48, wherein the instructions further comprise instructions for causing the one or more processing devices to:
   if the output indicates that power is not being drawn from the medical device by the USB peripheral device, perform at least one of the following:
      electrically isolating the USB peripheral device from the medical device and the patient; or
      activating an alarm.

50. A universal serial bus (USB) monitoring device, comprising:
   a memory, the memory configured to store instructions for execution;
   USB ports configured to receive respective USB connectors of respective USB peripheral devices to connect the respective USB peripheral devices to the USB monitoring device;
   current detection circuits respectively coupled to the USB ports, the current detections circuits having respective outputs;
   a USB hub circuit coupled to the current detection circuits, the USB hub circuit configured to provide power from a medical device to the respective USB peripheral devices and to provide signal connections between the USB peripheral devices and the medical device, the USB monitoring device being configured to be connected to the medical device and being configured to draw power from a device, the medical device being configured for use in a medical procedure with a patient; and
   one or more processing devices configured to execute the instructions, the instructions for causing the one or more processing devices to:
      determine whether one or more USB peripheral devices are connected to the USB monitoring device at any of the USB ports; and
      if one or more USB peripheral devices are determined to be connected to the USB monitoring device, determine whether any of the one or more USB peripheral devices is drawing power from the medical device by monitoring the respective outputs of the current detection circuits; and
      if the USB peripheral device is determined to not be drawing power from the medical device, providing an indication of a potentially unsafe condition, the potentially unsafe condition being that the USB peripheral device may be drawing power from a power supply independent of the medical device and thus may present a potential risk to the patient.

* * * * *

UNITED STATES PATENT AND TRADEMARK OFFICE
CERTIFICATE OF CORRECTION

PATENT NO. : 8,145,800 B2
APPLICATION NO. : 12/504306
DATED : March 27, 2012
INVENTOR(S) : Roland Levin It is certified that error appears in the above-identified patent and that said Letters Patent is hereby corrected as shown below:

On the Title Page, Item (73) Delete "Card" and insert -- Care --, therefor.

Col. 26, line 10, In Claim 50, Delete "detections" and insert -- detection --, therefor.

Signed and Sealed this
Fifteenth Day of May, 2012

David J. Kappos
*Director of the United States Patent and Trademark Office*